(12) United States Patent
Koriushenkov

(10) Patent No.: US 12,083,407 B2
(45) Date of Patent: Sep. 10, 2024

(54) DEVICE FOR SWITCHING OPERATING MODES OF A DYNAMIC PYLON

(71) Applicant: Nikolai A. Koriushenkov, St. Petersburg (RU)

(72) Inventor: Nikolai A. Koriushenkov, St. Petersburg (RU)

( * ) Notice: Subject to any disclaimer, the term of this patent is extended or adjusted under 35 U.S.C. 154(b) by 351 days.

(21) Appl. No.: 17/604,669

(22) PCT Filed: Mar. 17, 2020

(86) PCT No.: PCT/RU2020/000142
§ 371 (c)(1),
(2) Date: Oct. 18, 2021

(87) PCT Pub. No.: WO2020/218942
PCT Pub. Date: Oct. 29, 2020

(65) Prior Publication Data
US 2022/0212050 A1 Jul. 7, 2022

(30) Foreign Application Priority Data
Apr. 22, 2019 (RU) .............. RU2019112265

(51) Int. Cl.
*A63B 9/00* (2006.01)
*F16C 11/10* (2006.01)

(52) U.S. Cl.
CPC ............. *A63B 9/00* (2013.01); *F16C 11/10* (2013.01); *A63B 2209/08* (2013.01); *A63B 2244/225* (2013.01)

(58) Field of Classification Search
CPC . A63B 9/00; A63B 2209/08; A63B 2244/225; A63B 71/028; A63B 21/16; F16C 11/10
See application file for complete search history.

(56) References Cited

U.S. PATENT DOCUMENTS 9,017,419 B1 *  4/2015  Landry .................... H02K 7/06
                                             310/156.01
2011/0015647 A1 *  1/2011  Salisbury, Jr. ....... B25J 19/0004
                                             606/130

(Continued)

FOREIGN PATENT DOCUMENTS

RU         175664 U1 *  12/2017  ................ F16B 1/02

OTHER PUBLICATIONS

Machine translation of RU 175664 U1 of Korjushenkov, Dec. 13, 2017 (Year: 2017).*

(Continued)

*Primary Examiner* — Vinh Luong
(74) *Attorney, Agent, or Firm* — Lawrence G. Fridman, Esq.; FEIGIN & FRIDMAN, LLC

(57) ABSTRACT

Device for switching over the operating mode of a dynamic pylon for dances comprises as follows: the latch (2) at least one detail of pylon assemble with main recess (1) for the latch (2) at least one detail of another pylon assemble with counter-recess (8) for the latch (2) one magnet lock comprising at least one permanent magnet (7), whereas the main recess (1) for the latch (2) performed opened from the side of its lateral wall towards the outer space around the pylon detail wherein the main recess (1) is located, whereas the latch (2) is a member of the magnetic lock (the second or the third one). Switching over the mode of pylon operation is possible without interrupting the performance of exercises.

13 Claims, 14 Drawing Sheets

(56) References Cited

U.S. PATENT DOCUMENTS

| | | | |
|---|---|---|---|
| 2019/0151119 A1* | 5/2019 | Spencer | A61F 2/601 |
| 2019/0388179 A1* | 12/2019 | Krinninger | A61B 1/00149 |
| 2020/0375764 A1* | 12/2020 | Clausen | A61F 2/6607 |
| 2022/0104947 A1* | 4/2022 | Cook | A61F 2/34 |
| 2023/0201685 A1* | 6/2023 | Holmes | A63B 69/002 |
| | | | 473/575 |

OTHER PUBLICATIONS

Translation of PCT International Preliminary Report on Patentability of PCT/RU2020/000142 dated Sep. 28, 2021 (Year: 2021).*
International Search Report in corresponding International Application No. PCT/RU2020/000142.

* cited by examiner

DEVICE FOR SWITCHING OPERATING MODES OF A DYNAMIC PYLON

FIELD OF THE INVENTION

The invention relates to gymnastic equipment and more specifically to pylons intended for performance of gymnastic exercises and dances by artists.

There are static and dynamic pylons. Dynamic pylon comprises of the following assemblies: a pole and one or two supports. The pole and the supports are interconnected with a possibility of the pole rotation typically using one or more bearings. Moving assembly a "Pole" of the dynamic pylon provides a pillar of support for a performer of gymnastic exercises on the pole and can comprise of different combinations of multiple details, such as pipe, shaft, bushing, screw, nut and others. Static Support assembly of a dynamic pylon is intended for installation and retaining the pole at the operational location and can comprise of different combinations of various details such as disc, bushing, axle, and other details. Dynamic pylons can function both in static mode when the pylon pole cannot rotate and dynamic mode when pole is able to rotate. The dynamic pylon comprises the details whereof combination composes the device for switching over the operating mode of a pylon. Operational convenience of the dynamic pylon depends upon many factors including the mode switching-over convenience of its work, which in its turn is determined by the design peculiarities of the device for switching over the operating mode of a dynamic pylon.

BACKGROUND OF THE INVENTION

It is known the Dynamic pylon mode switching device (Patent CN107875609 published in Apr. 6, 2018) for a pylon, comprising of a combination of details included into different parts of the device: fixed, rotating and connecting ones. Fixed part comprises of a disc and a silicone gasket. Rotating part comprises of a fixed bushing with cogs, springs, a moving bushing with cogs, cams, dowel-pins, cylindrical rods, rotating bushings, silicone ring, and cylindrical pins. Connecting assembly comprises of coupling pipe, thrust bearing, bushing, gasket and radial bearings.

The disadvantages of the device under the patent CN107875609 include the manufacturing that requires to perform large amount of machine works and to make qualification assemble. In order to switch the pylon over from one mode to another it is required to bow down or sit down and pull up the outer bushing and then turn it at a certain angle and release it letting it go down by itself.

It is known a pylon (Patent FR3041884 published on 4 Jul. 2017) composing a combination of details forming a device for switching over its operating modes and comprising of:

The latch with cap fastened to it by a mechanical method;
The hollow cylinder, which is a part of the pole of the pylon and featured with at least one main recess for constant accommodation of the latch forming a guide for the latch movement. The main recess for the latch is provided in the wall of the hollow cylinder as at least one L-shape slot opened towards internal space of the hollow cylinder and towards outer space around it;
The lower support with a lug fit with recess for periodic temporary accommodation of the latch middle part. The lug is located inside the hollow cylinder.

The disadvantage of technical solution as per the Patent FR3041884 is a complex process of switching the operating modes of a dynamic pylon. In order to switch the pylon from dynamic operating mode into static one it is required to raise the cap up to move the latch up along the short vertical part of the slot all the way then turn it to move the latch in the horizontal part of the slot all the way and lower the cap down to move the latch down along the long vertical part of the slot. If the latch failed from the first attempt to get in the recess in the lug of the lower support the user is to turn the pole further for the latch to be above the recess. Then the latch is lowered down into the recess by gravity and the weight of the cap and/or as a result of control action on the cap. The pylon is in the static operating mode. In order to return the pylon into the dynamic operating mode it is required to perform the same actions with the cap and the latch but in reversed order.

It is known a pylon (Patent CZ30933U1 published on Aug. 21, 2017)—a prototype composing a combination of details forming a device for switching over its operating modes and comprising of:

The latch formed by two rods. The latch is featured with a handle performed as a bushing installed on the pole shaft with a possibility to move along it in vertical directions. Bushing-handle is installed in the upper parts of the rods;
Installed on the pole shaft the first ring with the main recesses for the latch rods wherein the rods are constantly partially accommodated with a possibility of their straight-line motion therein. These recesses are formed as vertical parallel through holes opened only towards up and down;
Caps of the lower support with counter-recesses for the rods for periodic temporary accommodation of the rods lower part. These recesses are formed as vertical parallel holes. The cap is installed on the support;
A magnetic lock comprising of three members:
First member—magnet comprising of two permanent magnets—cylindrically shaped details performed of magnetically hard material. Permanent magnets are installed with an interference fit in the upper part of the holes for magnets and for rods performed on the bushing-handle;
The second member—bushing-handle installed on the vertical crossbeam shaft with a possibility to move along it in vertical directions;
The third member—the second ring on the vertical crossbeam shaft performed of still—magnetically soft material—and installed on the vertical crossbeam shaft above the bushing-handle. This ring is intended for periodic temporary engagement with the permanent magnets.

Device chosen for the prototype as per Patent CZ30933U1 operates as follows:

When pylon is in the static operating mode the rods are located simultaneously both in the holes of the first ring and in the holes of the cap of the lower support and provide a mechanical obstacle to the rotation of the pole.

In order to switch the pylon over into dynamic operating mode it is required to bow down or sit down and having acted with two hands upon the radial lug of the bushing-handle with rods and permanent magnets replace this bushing-handle towards up along the pole shaft and clamp it down to the second ring intended for the engagement with the permanent magnets. The permanent magnets installed in the B cavities on the bushing-handle keep the latter clamped down to the second ring by the force of magnetic attraction. In the situation obtained by this method the rods are located beyond the holes in the cap of the support. The pylon is in the dynamic operating mode.

To return the pylon into the static operating mode it is required to bow down and push with two hands on the radial lug of the bushing-handle with rods and shift it down along the pole shaft. If the rods failed to get into the holes for rods in the cap on the support, then they bump up against the end surface of the cap somewhere between the holes for rods. Further the pole is rotated until the tapered parts of the rods are above the holes of the cap. With the further movement the rods are deepened into the holes of the cap until bushing-handle bump up against the first ring. In the situation obtained by this method the rods are located simultaneously both in the holes of the first ring and in the holes of the cap of the lower support and provide a mechanical obstacle to the rotation of the pole. The pylon is in the static operating mode.

Based on the above the device for switching over the operating mode of a dynamic pylon—the prototype comprising a latch is provided for creating a mechanical obstacle to the rotation of the pole of the pylon. The only magnetic lock of this device for switching over the operating mode of a pylon is provided for creating an obstacle to the latch movement within the main recess for the latch from a single required position by the force of a permanent magnet. The members of the magnetic lock of the device for switch over of operating modes of the pylon—the prototype is used only to create an obstacle to the movement of the latch in the main recess.

The disadvantage of the prototype is the complexity for switching over the operating mode of a pylon due to the fact that to switch over the pylon from one operating mode to another a performer of exercises is to sit down or bow down and acting with both hands on the handle of the device to move it from one position to another. This sequence of movements takes place within a certain period of time. The process of switching over the mode is complicated by the fact that a person cannot hold onto the pole of the pylon with hands, since both hands are busy providing control actions on the bushing-handle. In public appearances to switch over the operating mode of a pylon without being noticed by spectators is impossible. Switching over the operating modes of a dynamic pylon is performed only with two hands in manual mode.

SUMMARY OF THE INVENTION

The object of the claimed invention is to create a new device for switching over the operating mode of a dynamic pylon, which makes it possible to facilitate and speed up the process of switching over the operating mode of a dynamic pylon.

Technical result of the invention is a device for switching over the operating modes of a dynamic pylon making it possible to switch over the modes both in a normal manual mode, when a performer of exercises on the pylon moves the latch in the main recess by control action thereon, and in the semi-automatic mode when a performer of exercises on the pylon switches over the latch by control action thereon into position when the latch starts moving independently in the basic recess for the latch. This latch movement happens without participation of a performer at a speed exceeding the physiological athletic ability of a performer, as a result of the action of magnetic forces of permanent magnets composing the magnets of different magnetic locks. This means that the same combination of details with a permanent magnet in the proposed device for switching over the operating modes of the pylon is used not only as a device to create an obstacle to the movement of the latch from the required position by the force of a permanent magnet (magnetic lock) but also as a device for transforming magnetic energy of a permanent magnet into mechanical work to move the latch to the required position (an actuator).

The device proposed for switching over the operating modes of a pylon facilitates and reduces the cost of pylons manufacturing as it has a simple design that ensures ease of assembly of the pylon and consists of a small number of simple to manufacture details of small dimensions.

In addition, the technical solution proposed makes it possible to locate the device for switching over the operating modes of a dynamic pylon at the lower support of the pylon, at the upper support and simultaneously at both supports. This in its turn makes it possible to manufacture double-sided poles of pylons and double-sided pylons the design thereof allows to choose the screw location of the screw assembly of the pylon.

The technical result is achieved by the fact that the dynamic pylon composes a device for switching over the operating modes of a dynamic pylon including a latch intended for creating a mechanical obstacle to the rotation of the pole of the pylon, at least one detail of pylon assembly with the main recess for the latch wherein the latch is constantly or at least partially located with a possibility of straight line motion thereof inside this recess, at least one detail of another pylon assembly with a counter-recess for the latch intended for a part of the latch to have periodic temporary accommodation therein to create a mechanical obstacle for the pole rotation, a magnetic lock intended to obstruct the latch movement within the main recess for the latch from the required position by means of magnetic force of a permanent magnet including three hereinafter contained members: the first member—a magnet comprising of at least one permanent magnet—a detail built of a magnetically hard material, the second member—being at least one detail for the magnet to be installed thereon, the third member—at least one detail intended for periodic temporary engagement with the magnet, however the main recess for the latch built opened on the lateral wall side to outer space around the pylon detail wherein the main recess is located.

Also, the technical result is achieved by the fact that the main recess for the latch is connected to outer space by a slot built in a wall of at least one detail of pylon assembly and separating the main recess for the latch from outer space around the pylon detail, wherein the main recess is located.

Also, the technical result is achieved by the fact that the latch is featured with a handle located in the slot.

Also, the technical result is achieved by the fact that the slot provides an access to the latch.

Also, the technical result is achieved by the fact that the part of the latch extends from the main recess for the latch through the slot beyond the over-all dimensions of at least one pylon detail, wherein the main recess for the latch is provided.

Also, the technical result is achieved by the fact that the main recess is performed as a groove located on the lateral wall of at least one detail of pylon assembly.

Also, the technical result is achieved by the fact that the latch located in the groove is featured with a handle.

Also, the technical result is achieved by the fact that the part of the latch extends beyond the over-all dimensions of at least one pylon detail wherein the grove is located.

Also, the technical result is achieved by the fact that the external surface of the latch is at least partially featured with deepenings.

Also, the technical result is achieved by the fact that the latch is the second member of the magnetic lock and at least one detail of pylon assemble, wherein the main recess for the latch is located and which is the third member of the magnetic lock and performed at least partially of magnetically soft material.

Also, the technical result is achieved by the fact that the latch is the second member of the magnetic lock and at least on one detail of pylon assemble wherein the main recess for the latch is located and which is the third member of the magnetic lock performed is at least partially one detail made of magnetically hard material—permanent magnet.

Also, the technical result is achieved by the fact that the latch is the second member of the magnetic lock and at least one detail of pylon assemble wherein the main recess for the latch is located and which is the third member of the magnetic lock and performed at least partially of magnetically soft material.

Also, the technical result is achieved by the fact that the latch is the second member of the magnetic lock and at least on one detail of pylon assemble wherein the main recess for the latch is located and which is the third member of the magnetic lock installed is at least one detail made of magnetically hard material—permanent magnet.

Also, the technical result is achieved by the fact that the latch is the second member of the magnetic lock and the outer bearing ring made of magnetically soft material and installed in the pylon is the third member of the magnetic lock.

Also, the technical result is achieved by the fact that the latch made at least partially of magnetically soft material is the third member of the magnetic lock and at least one detail of pylon assemble wherein the main recess for the latch is located and is the second member of the magnetic lock.

Also, the technical result is achieved by the fact that the latch made at least partially of magnetically soft material is the third member of the magnetic lock and at least one detail of pylon assemble wherein the counter-recess for the latch is located is the second member of the magnetic lock.

Also, the technical result is achieved by the fact that the detail made of magnetically hard material—permanent magnet—is installed in the cavity for the permanent magnet in the detail of pylon with the sinking in relation to the wall surface of the pylon detail, wherein this cavity for the permanent magnet is performed.

Also, the technical result is achieved by the fact that the detail made of magnetically hard material—permanent magnet—is installed in the cavity for the permanent magnet in the detail of pylon, formed at least partially of magnetically soft material with such a sinking in relation to the wall surface of the pylon detail, wherein this cavity for the permanent magnet is made, so that the force of magnetic attraction between permanent magnet and the cavity walls, wherein it is assembled, is more than force of magnet attraction between the permanent magnet and the counter-detail therefor.

Also, the technical result is achieved by the fact that device for switching over the operating mode of a dynamic pylon comprises at least one additional magnet lock intended for creating an obstacle for the latch movement in the main recess for the latch from the different from first required position, by the magnet force of the additional magnetic lock comprising at least of one permanent magnet.

Also the technical result is achieved by the fact that the magnet of the magnetic lock provides the latch movement in the main recess for the latch into the required position from the position, wherein a performer placed it and wherein the magnetic force of the magnet of this magnetic lock acting upon the latch is more than the sum of magnetic forces of magnets of other magnetic locks acting upon the locks, latch force of gravity and frictional force between the latch and the latch recess walls, both the main and the counter one.

GENERAL DESCRIPTION OF THE INVENTION

Figure 1:
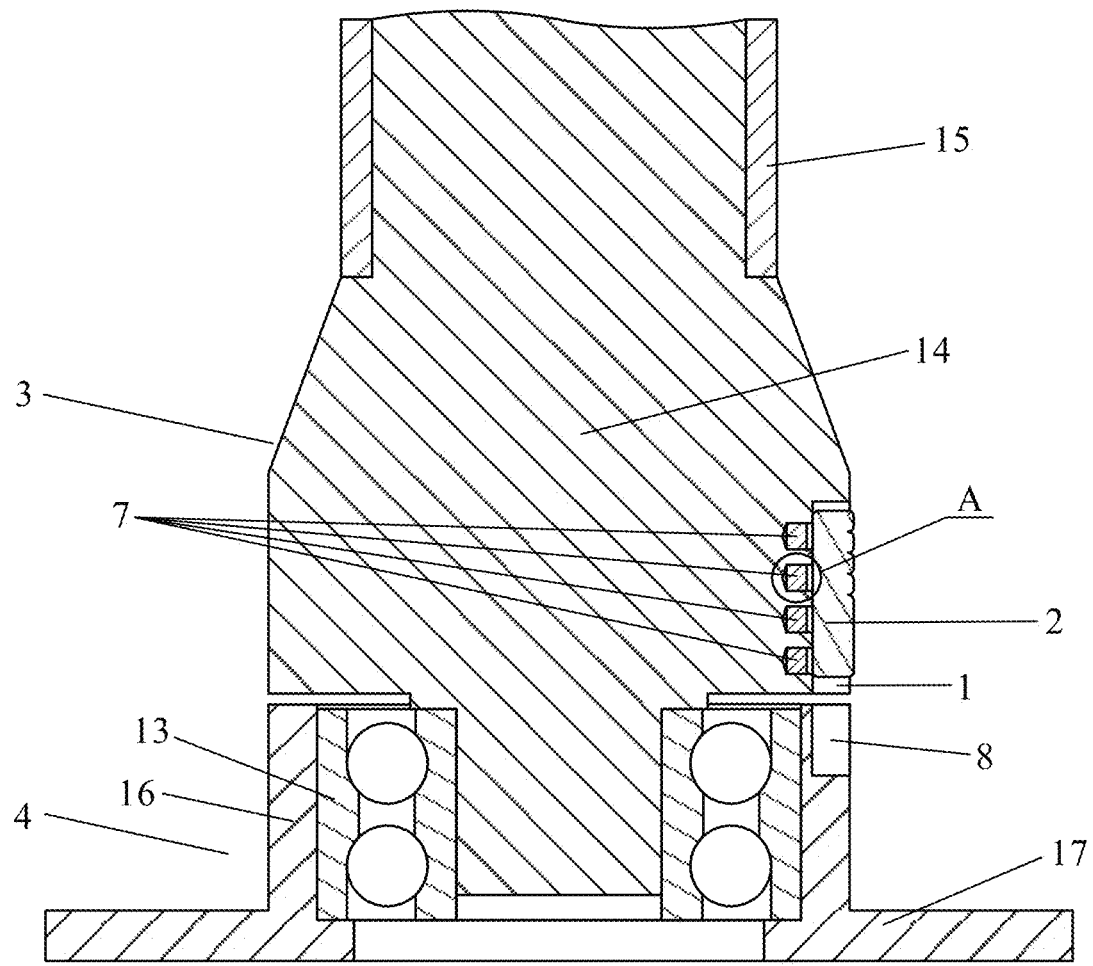
FIG. 1 shows an axial section of a part of the dynamic pylon in the dynamic operating mode with the device for switching over the operating modes with magnetic lock, when the main recess is performed in the detail of pole of the pylon the counter-recess is performed in the detail of the support of the pylon located at the lower bearing surface for the pylon.

It should be noted that structural members and process connections that do not affect the operability of the device for switching over the operating mode of a dynamic pylon not shown in the drawings or shown for clarity.

In the case when the recess (either the main 1 or the counter 8 one) for the latch 2 is provided at least in one detail of the lower support 4, then the mating recess (either counter 8 one or the main 1 one) for the latch 2 is performed at least in one detail on the lower end of the pole 3. In the case when the recess (either the main 1 or the counter 8 one) for the latch 2 is formed at least in one detail of the upper support 5, then the mating recess (either counter 8 one or the main 1 one) for the latch is performed at least in one detail on the upper end of the pole 3. In the case when the parts for connecting the pole 3 with the lower support 4 and with the upper support 5 are made identically and when apart from one of the recesses for the latch 2 is composed in any one support, then the pole 3 can have two parts with the identical recesses for the latch 2 located at different ends of the pole 3. In this case, when installing a pylon with two supports at the operational location it is possible to make choice for the location of the screw 9 of the screw assembly of the pylon. Thus, for the first time a double-sided pole 3 of a dynamic pylon for gymnastic exercises was created.

Figure 5:
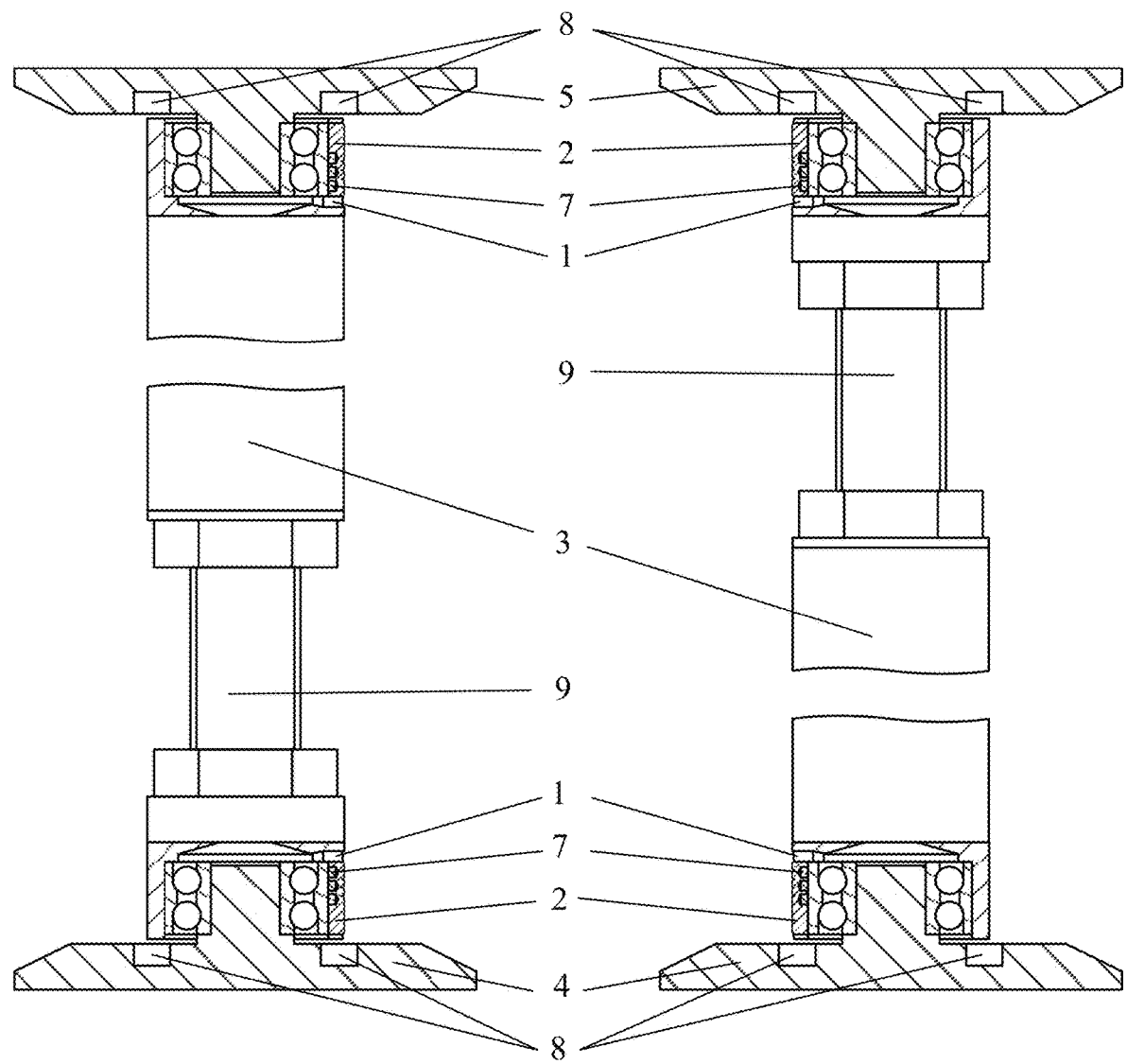
FIG. 5 shows two dynamic pylons with the devices for switching over the operating modes located both at the lower bearing surface for the pylon and at the upper bearing surface for the pylon.
Figure 14:
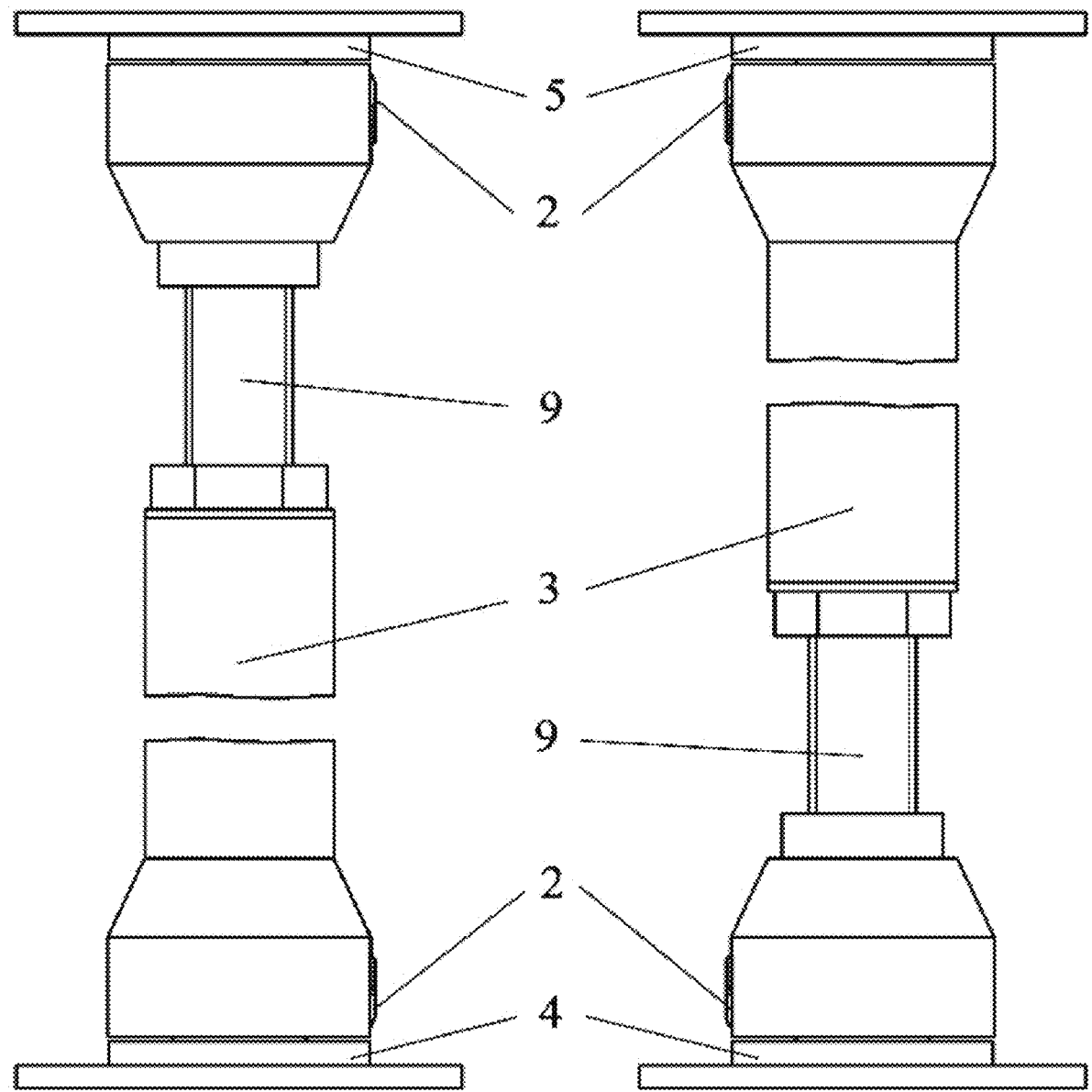
FIG. 14 shows two dynamic pylons with the devices for switching over the operating modes located both at the lower bearing surface for the pylon and at the upper bearing surface for the pylon.

This device for switching over the operating mode of a dynamic pylon can be included in the structure of pylon with two supports both at the lower bearing surface and at the upper bearing surface. A pylon can be equipped with two devices for switching over its operating modes whereof one is located at one support and another at the opposite support of the pylon. (FIGS. 5 and 14). In this case, when installing a pylon at the operational location it is possible to make choice for the location of the screw 9 of the screw assembly of the pylon. Thus, for the first time a double-sided dynamic pylon for gymnastic exercises is created.

Geometrical dimensions, location and a shape of recesses (1 and 8) performed in details of supports (4 and 5) of the pylon and in the details of the pole 3 of the pylon, also geometrical dimensions and shape of the latch 2 are coordinated with each other and are chosen by the latch 2 arrangement conditions in the main recess 1 with a possibility of straight line motion therein and a periodic temporary accommodation of the part of the latch 2 in the counter-recess 8 for creating a mechanical obstacle to the rotation of the pole 3. Shape of the latch 2 cross-section can be multilateral, rectangular, round, T-shaped, dovetail and other. Latch 2 can be of a stepped configuration. Parts of latch 2 may be of different cross-section.

For example, main recess 1 is made as a through hole or blind hole connected with the outer space with slot 10 performed in the wall of the detail of pylon assemble. Slot 10 can provide an access to the latch 2. A part of the latch 2 can protrude from the main recess 8 through the slot 10 beyond the over-all dimensions of the detail of the pylon assemble. In addition, a handle 6 can be located in the slot 10 with a possibility of movement therein. The width of the slot 10 can be equal to the maximum width of the main recess 1 for the latch 2. For example, the main recess 1 in the detail of the pylon assembly is performed as a groove. At least the external surface of the latch 2 can be featured at least partially with recesses. Also, the main recess 1 can be performed either in one or a few details for the pole 3 of the pylon or in one or a few details for the lower support 4 or in one or a few details for the upper support 5. At least one counter-recess 8 can be performed in one or a few details of the pylon assembly. The counter-recess 8 can be built in the shape of a (through or blind) hole, a groove (vertical or horizontal), a slot and the like formed at least in one detail of the pylon.

The condition of sufficiency of the magnetic attraction force acting between the magnet of the magnetic lock and its member to hold the latch 2 inside the main recess 1 in the required position determines the number and parameters of the permanent magnets 7, composing the magnet of the magnetic lock, as well as characteristics of the materials used for the manufacture of details that are elements of a magnetic lock.

The magnet of a magnetic lock can be performed in the form of a monolithic detail 7 made of magnetically hard material, as well as in the form of a set of a few monolithic details 7 each made of magnetically hard material.

A magnet of a magnetic lock as a monolithic detail 7 or as a set of monolithic details 7 can be installed on details—a member of a magnetic lock—with the help of magnetic attraction forces or with the help of glue. Since blind or through holes of various cross-sections, grooves of various cross-sections, slots and so on can be made to install the permanent magnet 7 on the details, it can be summarized that in order to install the permanent magnet 7 on the details, a cavity 11 for the magnet 7 is made thereon. The permanent magnet 7 can be installed in the cavity 11 on the detail with an interference fit installation method, edge deformation method of the cavity 11, and other known methods like that. A detail of magnetically permeable material can be installed between the permanent magnet 7 and one or multiple walls of the cavity 11.

The geometrical dimensions and shape of the cavity 11 for the permanent magnet 7 performed in the pylon detail, as well as the geometrical dimensions and shape of the magnet 7 are coordinated with each other and are selected from the installation conditions of the magnet 7 in the cavity 11 in order to create the obstacle to the movement of the latch 2 in the main recess 1. The shape of the magnet 7 can be multilateral, rectangular, cylindrical and others.

The best option for the proposed technical solution is a situation wherein the permanent magnet 7 is installed in the cavity 11 in the detail with a sinking 12 relative to the surface of the outer wall of the detail wherein this cavity 11 is performed in order to avoid damage to the surface of the permanent magnet 7 as a result of mechanical contact with other objects.

The best option for the claimed technical solution is a situation wherein the permanent magnet 7 is installed in the cavity 11 in the detail made of magnetically soft material—steel—with sinking 12 relative to the surface of outer wall of the pylon detail, wherein this cavity 11 is formed. The sinking 12 specified due to the choice of its value makes it possible to adjust the distance from the permanent magnet 7 to the counter-detail therefor in order to regulate the force of magnetic attraction acting between them in order to make this force less than the force of magnetic attraction acting between the permanent magnet 7 and the walls of the cavity 11 wherein it is installed. As a result, the permanent magnet 7 installed in the cavity 11 on the detail made of a magnetically soft material is held inside this cavity 11 due to its own magnetic force without the use of additional means (glue, sealant, etc.) and does not come into contact with the counter-detail. This installation of the permanent magnet 7 facilitates the installation of the permanent magnet in the cavity 11 and its replacement in cases where the permanent magnet 7 loses some of its strength or is destroyed.

In the position of the latch 2, when it is located only in the main recess 1 of the pylon assemble and beyond the counter-recess 8 of another pylon assemble whereof one is the pole 3 of the pylon the pole 3 can be rotated. The pylon is in the dynamic operating mode. In the position of the latch 2, when it is located simultaneously in the main recess 1 of the pylon assemble and in the counter-recess 8 of another pylon assemble whereof one is the pole 3 of the pylon, the pole 3 cannot be rotated. The pylon is in the static operating mode. To switch over the pylon from one operating mode to another it is necessary to move the latch 2 in the recess 1 from one position to another. In accordance with the technical solution proposed the main recess 1 for the latch 2 is performed opened from the side of its lateral wall towards the outer space around the pylon detail, wherein the main recess 1 is located. Therefore, the control action for the latch 2 movement in the recess 1 is provided directly upon the latch 2 or upon its handle 6 from the side of the lateral wall of the latch 2, through the open space in the wall of the pylon detail or upon a detail of the latch 2 or upon its handle 6 protruding through the open space in the wall of the pylon detail into the outer space around this pylon detail, wherein the recess 1 is formed. In this case, the latch 2 is fixed in the required position in the main recess 1 by the magnetic attraction force of the magnet of the magnetic lock composing at least one permanent magnet 7.

To fix the latch 2 in the desired position in the main recess 1, friction spacers, a ball with a spring installed in a blind hole in the wall of the main recess for the latch, and other known devices for fixing the latch in the main recess for the latch can be used.

DESCRIPTION OF THE EMBODIMENTS OF THE INVENTION

Operation of the device for switching over the operating mode of a dynamic pylon is explained in the following examples.

Example 1. FIG. 1 shows an axial section of a part of the dynamic pylon with the device for switching over the operating mode of a dynamic pylon, when the lower support 4 of the pylon is located on the lower bearing surface for the pylon (for example, on the stage floor). Shaft 14 and pipe 15 are connected with an interference fit installation method and comprise the "pole 3" pylon assemble. Shaft 14 can comprise of multiple details and be dismountable. The other details of the pole of the pylon are not shown in FIG. 1. The pylon assembly "Lower support 4" is formed as a monolithic detail comprising a bushing 16 and a disc 17. The other details of the support 4 are not shown in FIG. 1. Bearing 13 is installed in the bushing 16 and shaft 14 is installed into inner ring of the bearing 13.

Figure 2:
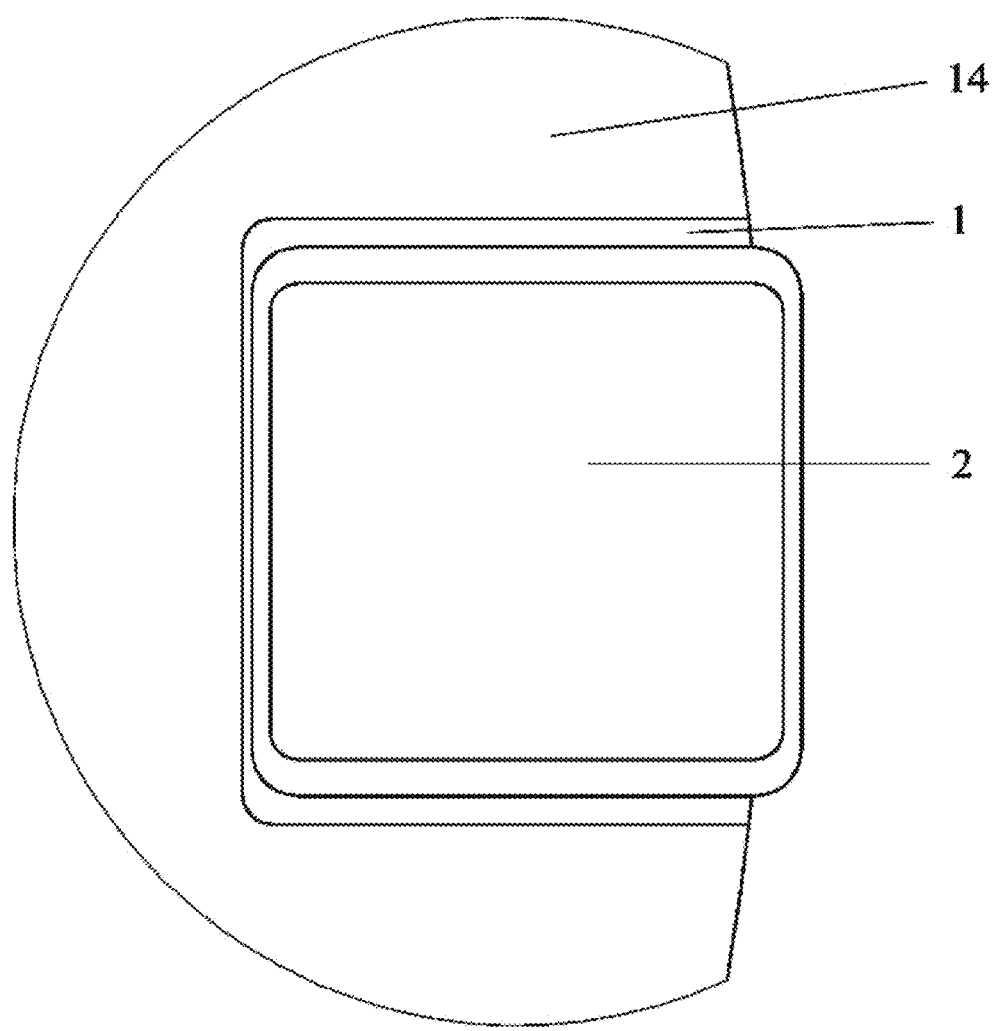
FIG. 2 shows the installation of the latch into the main recess performed on the pole shaft of the pylon.

Device for switching over the operating mode of a dynamic pylon comprises of:

latch 2 made as a rod of rectangular cross-section. The wall of the latch 2 faced to outer space around the shaft 14 is featured with deepenings. The latch 2 can be made as a pin of round cross-section with a lateral surface featured with deepenings;

Shaft 14 of the pole 3 with the main recess 1 for the latch 2 is made as a groove of rectangular cross-section opened downward and into the outer space around the shaft 14. A part of the latch 2 protrudes from the main recess 1 towards the outer space beyond the dimensions of the shaft 14. The installation of the latch 2 into the main recess 1 of the shaft 14 is shown in FIG. 2;

Bushing 16 of the support 4 with the main counter-recess 8 for the latch 2 made as a groove of rectangular cross-section opened towards the outer space and upward. In the bushing 16 of the support 4 multiple counter-recesses 8 for the latch 2 can be provided;

a magnetic lock intended to create an obstacle for the spontaneous movement of the latch 2 inside the main recess 1 of the shaft 14 of the vertical crossbeam 3 and for unauthorized removal of the latch 2 from the main recess 1.

Figure 3:
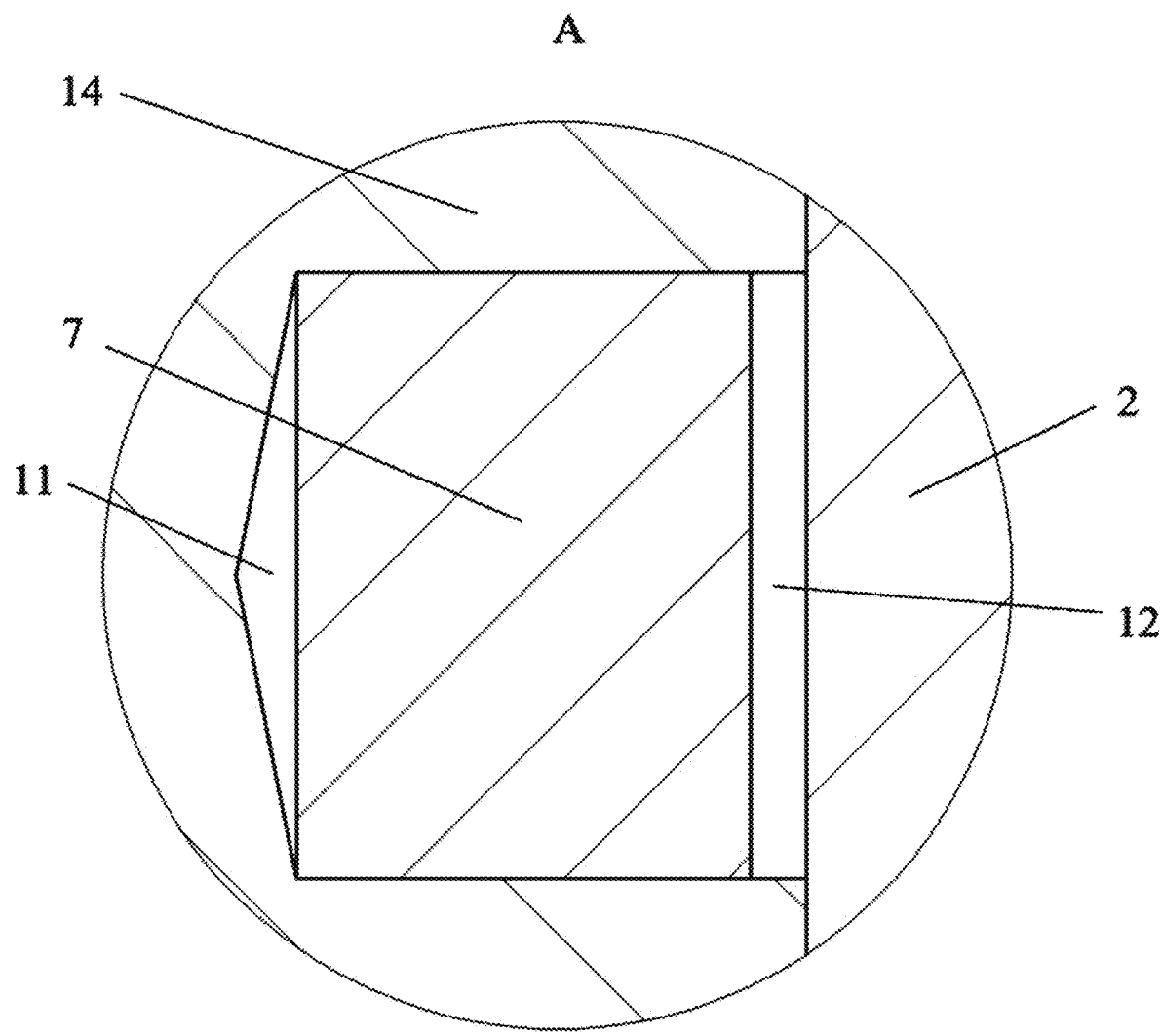
FIG. 3 shows the detail "A" of the drawing presented in FIG. 1, wherein the permanent magnet installed in the cavity for magnet in the wall of the main recess for the latch in the detail of pylon assemble with sinking.

Magnetic lock comprises:

The first member of the magnetic lock—magnet comprising of multiple permanent magnets 7—monolithic cylindrically shaped details formed of magnetically hard material;

The second member of the magnetic lock—shaft 14 formed of magnetically soft material—steel with permanent magnets 7. FIG. 3 shows the detail "A" of the drawing presented in FIG. 1 displaying installation of magnet 7 onto the shaft 14.

Each permanent magnet 7 is installed in a cavity 11 intended for mounting this permanent magnet 7 and provided in the wall of the main recess 1 of the shaft 14 with a sinking 12 relative to the wall surface of the main recess 1 to avoid damage to the surface of the permanent magnet 7 from contact with the wall of the latch 2. The depth of the sinking 12 is selected so that the force of magnetic attraction of the permanent magnet 7 to the latch 2 is less than the force of its attraction to the walls of the cavity 11 in the wall of the main recess 1. Thus, the permanent magnet 7 is fixed in the cavity 11 by its own magnetic force. Application of additional means such as glue or methods such as an interference fit method is not required. In this case the force of magnetic attraction acting between the magnet of the magnetic lock comprising of permanent magnets 7 and the latch 2 is sufficient to hold the latch 2 in the required position in the main recess 1;

The third member of the magnetic lock—latch 2 is made of magnetically soft material—steel.

Device for switching over the operating mode of a dynamic pylon shown in FIG. 1 operates as follows:

Under the condition shown in FIG. 1, the pylon is in dynamic operating mode—the latch 2 is located only in the main recess 1 of the shaft 14 of the pole 3 and outside the counter-recess 8 of the bushing 16 of the support 4 and the pole 3 can be rotated. In this position the latch 2 is held by the magnetic attraction force acting between the magnet of the magnetic lock comprising of a few permanent magnets 7 installed in the cavities 11 in the vertical wall of the main recess 1 of the shaft 14—the second member of the magnetic lock and the latch 2—the third member of the magnetic lock. As a result of the action of this force the latch 2 imposes pressure on the inner vertical wall of the main recess 1 and causes thereby a friction force between the latch 2 and the vertical wall of the recess 1 which prevents the movement of the latch 2 along the surface of the vertical wall of the recess 1.

To switch over the pylon to a static operating mode it is necessary to position the latch 2 above the counter-recess 8 by turning the pole 3 clockwise or counter-clockwise. Then a control action in the direction from top to bottom is to be performed, for example, with a foot on the part of the latch 2 protruding from the main recess 1 of the shaft 14 into the outer space beyond the dimensions thereof. As a result of the control action the lower part of the latch 2 which is featured with lead-in sections is partially sunk into the counter-recess 8. Further it is necessary to continue to perform a control action for the latch 2 to drop down into the recess 8 and to reach its lower end. In this position the latch 2 is held by the attraction force of magnet of the magnetic lock and the friction force acting between the latch 2 and the lower end of the counter-recess 8. In the situation obtained by this method the latch 2 is located simultaneously both in the recess 1 and in the recess 8 and creates a mechanical obstacle to the rotation of the vertical crossbeam. The pylon is in the static operating mode.

To return the pylon to the dynamic operating mode it is necessary to perform a control action in the direction from the bottom upwards, for example, with a foot on the part of the latch 2 protruding from the main recess 1 towards the outer space beyond the dimensions of the shaft 14 until the latch 2 reaches the upper end of the main recess 1. In this position the latch 2 is held by the attraction force of magnet of the magnetic lock and the friction force acting between the latch 2 and the vertical wall of the main recess 1. In the situation obtained by this method the latch 2 is located only in the recess 1 and beyond the recess 8 and does not create a mechanical obstacle to the pole 3 rotation. The pylon is in the dynamic operating mode.

If the latch 2 which is the third member of the magnetic lock the permanent magnets 7 (the first member of the magnetic lock) whereof are installed on the shaft 14 (the second member of the magnetic lock) is made, for example, of non-magnetic stainless steel then the latch 2 comprises at least one detail made of a magnetically soft material, for example, steel (i.e. made at least partially of a magnetically soft material) or at least one detail made of a magnetically hard material—a permanent magnet (not shown in FIG. 1).

A performer of exercises on the pylon a part whereof is shown in FIG. 1, switches it over from dynamic operating mode into static one as follows: having rotated the pole 3 clockwise or counter-clockwise the performer positions the latch 2 above the counter-recess 8. To do this a performer is to see both the latch 2 and counter-recess 8 of the bushing 16 of lower support at the same time. Then, for example, with a foot the performer makes a control action on the part of the latch 2 protruding from the main recess 1 of the shaft 14 and moves it down until it stops. The pylon is in the static operating mode.

Returning the pylon from static to dynamic operating mode is performed as follows: acting by touching, for example, with a foot on the part of the latch 2 protruding from the main recess 1 of the shaft 14 of the vertical crossbeam switches the latch 2 upwards until it stops. The pylon is in the dynamic operating mode.

Figure 4:
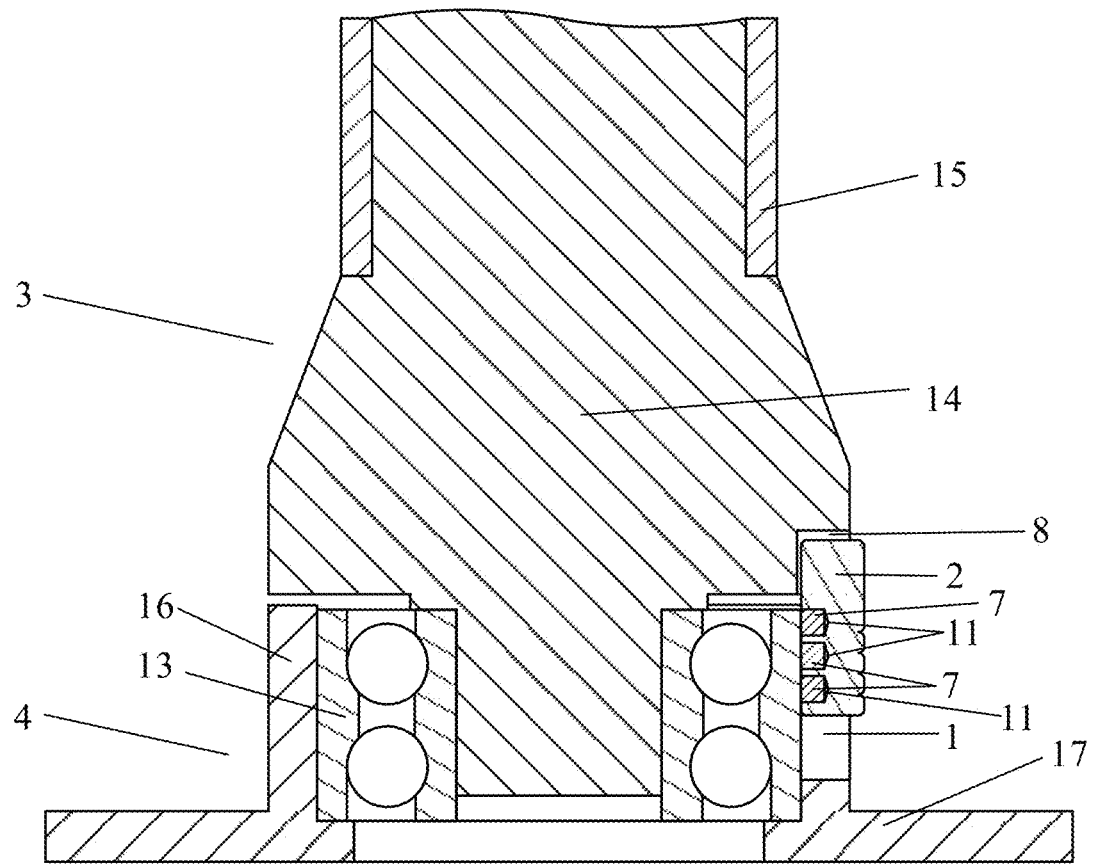
FIG. 4 shows an axial section of a part of the dynamic pylon in the static operating mode with the device for switching over the operating mode with magnetic lock, when the main recess is performed in the detail of support of the pylon located at the lower bearing surface for the pylon, wherein the counter-recess is formed in the detail of pole of the pylon.

Example 2. FIG. 4 shows an axial section of a part of the dynamic pylon with device for switching over its operating modes when the lower support 4 of the pylon is located on the lower bearing surface for the pylon (for example, on the stage floor). Shaft 14 and pipe 15 are connected by an interference fit installation method and comprise the pole 3. Shaft 14 can comprise of a few details and be dismountable. The other details of the pole 3 of the pylon are not shown in FIG. 4. The lower support 4 is performed as a monolithic detail comprising a bushing 16 and a disc 17. The other details of the support 4 are not shown in FIG. 4. Bearing 13 is installed in the bushing 16 and shaft 14 is installed into inner ring of the bearing 13.

Device for switching over the operating mode of a dynamic pylon comprises of:

latch 2 formed as rod of rectangular cross-section. The wall of the latch 2 faced to outer space is provided with multiple deepenings;

Bushing 16 of the support 4 with the main recess 1 performed as a groove of rectangular cross-section opened upward and into the outer space. The groove is formed by the walls of a vertical slot of rectangular cross-section made in the wall of the bushing 16 and the outer surface of the outer ring of the bearing 13 installed in the bushing 16. The latch 2 partially protrudes from the main recess 1 towards the outer space beyond the dimensions of the bushing 16 of the lower support;

Shaft 14 of the pole 3 with the counter-recess 8 for the latch 2 formed as a groove opened towards the outer space and downward. In the shaft 14 a few counter-recesses 8 for the latch 2 can be provided;

A magnetic lock intended to create an obstacle for the spontaneous movement of the latch 2 inside the main recess 1 of the shaft 14 and for unauthorized removal of the latch 2 from the main recess 1.

Magnetic lock comprises:

The first member of the magnetic lock—magnet comprising of multiple permanent magnets 7—monolithic cylindrically shaped details made of magnetically hard material;

The second member of the magnetic lock—the latch 2 made of steel with a magnet comprising of permanent magnets 7 installed with glue in cavities 11 made in the form of blind cylindrical holes in the vertical wall of the latch 2 faced to the outer surface of the outer ring of the bearing 13;

The third member of the magnetic lock—outer ring of the bearing 13 performed of magnetically soft material—steel.

Device for switching over the operating mode of a dynamic pylon shown in FIG. 4 operates as follows:

Under the condition shown in FIG. 4 the pylon is in the static operating mode—latch 2 is located simultaneously both in the main recess 1 in the bushing 16 of the lower support and in the counter-recess 8 of the shaft 14 of the vertical crossbeam 3 and thus creates a mechanical obstacle to the vertical crossbeam 3 rotation. In this position the latch 2 is held by the magnetic attraction force acting between the magnet of the magnetic lock (the first member of the magnetic lock) comprising of a few permanent magnets 7 installed with glue in the cavity 11 which are blind holes in the vertical wall of the latch 2 (the second member of the magnetic lock) and the outer ring of the bearing 13 (the third member of the magnetic lock). As a result of the influence of the magnetic attraction force acting between the members of the magnetic lock the latch 2 imposes pressure on the outer surface of the outer ring of the bearing 13, as a result of this pressure a friction force arises between the latch 2 and the outer ring of the bearing 13 which prevents the movement of the latch 2 along the surface of the outer ring of the bearing 13.

To switch the pylon to a dynamic operating mode a control action in the direction from top to bottom is to be performed, for example, with a foot on the part of the latch 2 protruding from the counter-recess 8 beyond the dimensions of the shaft 14 into the outer space, and from the main recess 1 beyond the dimensions of the bushing 16, this occurs until the latch 2 reaches the lower end of the main recess 1. In this position the latch 2 is held by the attraction force of magnet of the magnetic lock and the friction force between the latch 2 and the lower wall of the main recess 1. In the situation obtained by this method the latch 2 is located only in the recess 1 and beyond the recess 8 and does not create a mechanical obstacle to the pole 3 rotation. The pylon is in the dynamic operating mode.

To switch over the pylon to a static operating mode it is necessary to position the counter-recess 8 above the latch 2 by rotating the pole 3 clockwise or counter-clockwise. Then a control action in the direction from bottom to top is to be performed, for example, with a foot on the part of the latch 2 protruding from the main recess 1 of the bushing 16 into the outer space beyond the dimensions thereof. As a result of this action the upper part of the latch 2 which is featured with lead-in sections is partially sunk into the counter-recess 8. Further, it is necessary to continue to perform a control action upon the part of the latch 2 protruding outside for the latch 2 to lift up in the recess 8 and to reach its upper end. In such position the latch 2 is held by the attraction force of magnet of the magnetic lock and the friction force between the latch 2 and the outer ring of the bearing 13. In the situation obtained by this method the latch 2 is located simultaneously both in the recess 1 and in the recess 8 and creates a mechanical obstacle to the pole 3 rotation. The pylon is in the static operating mode.

A performer of exercises on the pylon a part whereof is shown in FIG. 4 switches it over from dynamic operating mode into static one as follows: having rotated the pole 3 clockwise or counter-clockwise the performer positions the counter-recess 8 of the shaft 14 of the vertical crossbeam 3 above the latch 2. To do this a performer is to see both the counter-latch 8 of the shaft 14 of the pole 3 and the latch 2. Then, for example, with a foot the performer makes a control action on the part of the latch 2 protruding from the main recess 1 of the bushing 16 of the support 4 and moves the latch upwards until it stops. The pylon is in the static operating mode.

Returning the pylon from static to dynamic operating mode is performed as follows: acting, for example, with a foot on the part of the latch 2 protruding from the counter-recess 8 of the shaft 14 of the pole 3 and from the main recess 1 of the bushing 16 of the support 4, a performer switches the latch 2 down until it stops. The pylon is in the dynamic operating mode.

FIG. 5 shows two dynamic pylons with the devices for switching over the operating modes located both at the lower bearing surface for the pylon (for example, the stage floor) and at the upper bearing surface for the pylon (for example, the stage ceiling). But for the dynamic pylon shown in FIG. 5 at the left the screw 9 of the screw assembly of the pylon is located at the bottom of the pole 3 that provides convenience for the mantling and dismantling of the pylon at the operational location. And in the dynamic pylon shown in FIG. 5 on the right the screw 9 of the screw assembly of the pylon is located at the top of the pole 3 that provides convenience for the exercise to be performed on the pole 3.

Figure 6:
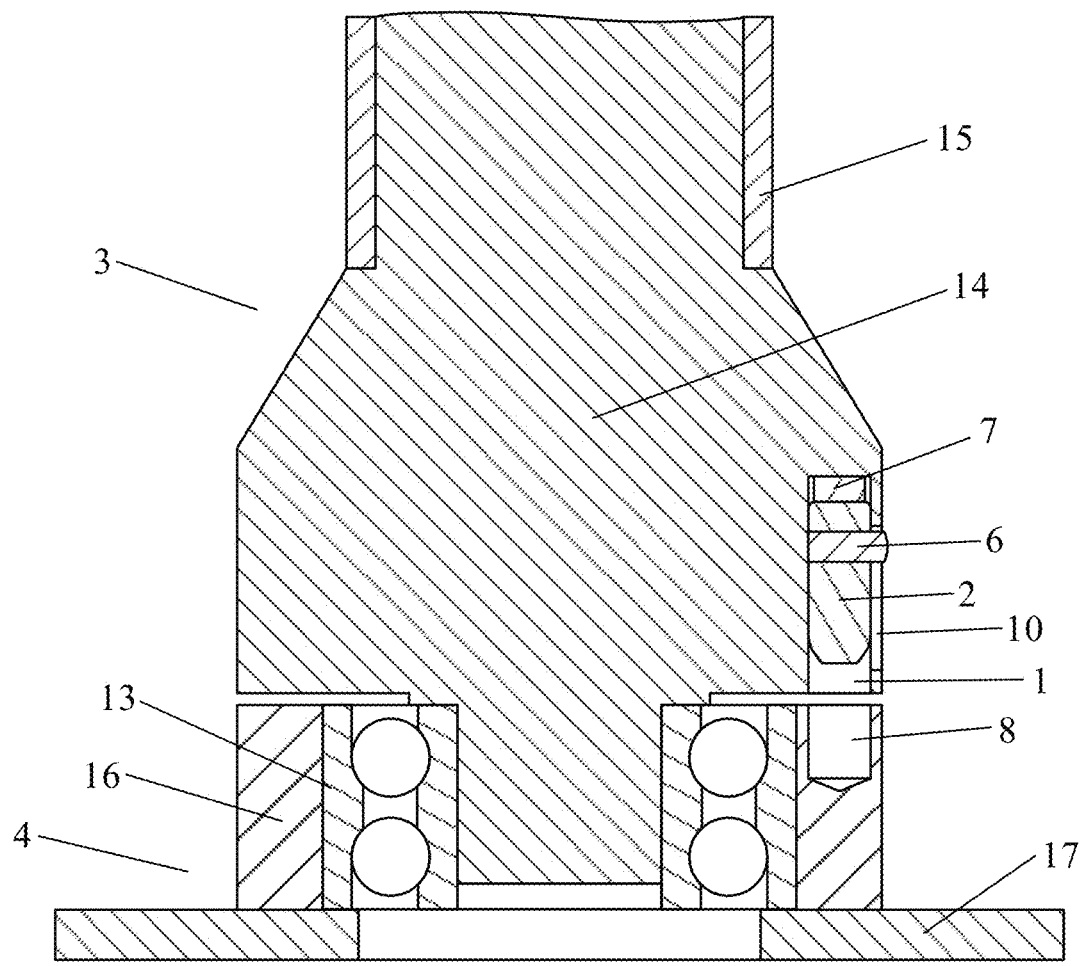
FIG. 6 shows an axial section of a part of the dynamic pylon in the dynamic operating mode with the device for switching over the operating modes with magnetic lock, when the main recess is made in the detail of pole of the pylon, the counter-recess is formed in the detail of the support of the pylon located at the lower bearing surface for the pylon.

Example 3. FIG. 6 shows an axial section of a part of the dynamic pylon with the device for switching over the operating modes when the lower support 4 of the pylon is located on the lower bearing surface (for example, on the stage floor). Shaft 14 and pipe 15 are connected with an interference fit installation method and comprise the pole 3. Shaft 14 can comprise of a few details and be dismountable. The other details of the pole 3 of the pylon are not shown in FIG. 6. The bushing 16 and disc 17 comprise of the support 4 and joined together with screw connections. The screw connections and other details of the lower support are not shown in FIG. 6. Bearing 13 is installed in the bushing 16 and shaft 14 is installed into inner ring of the bearing 13.

Figure 7:
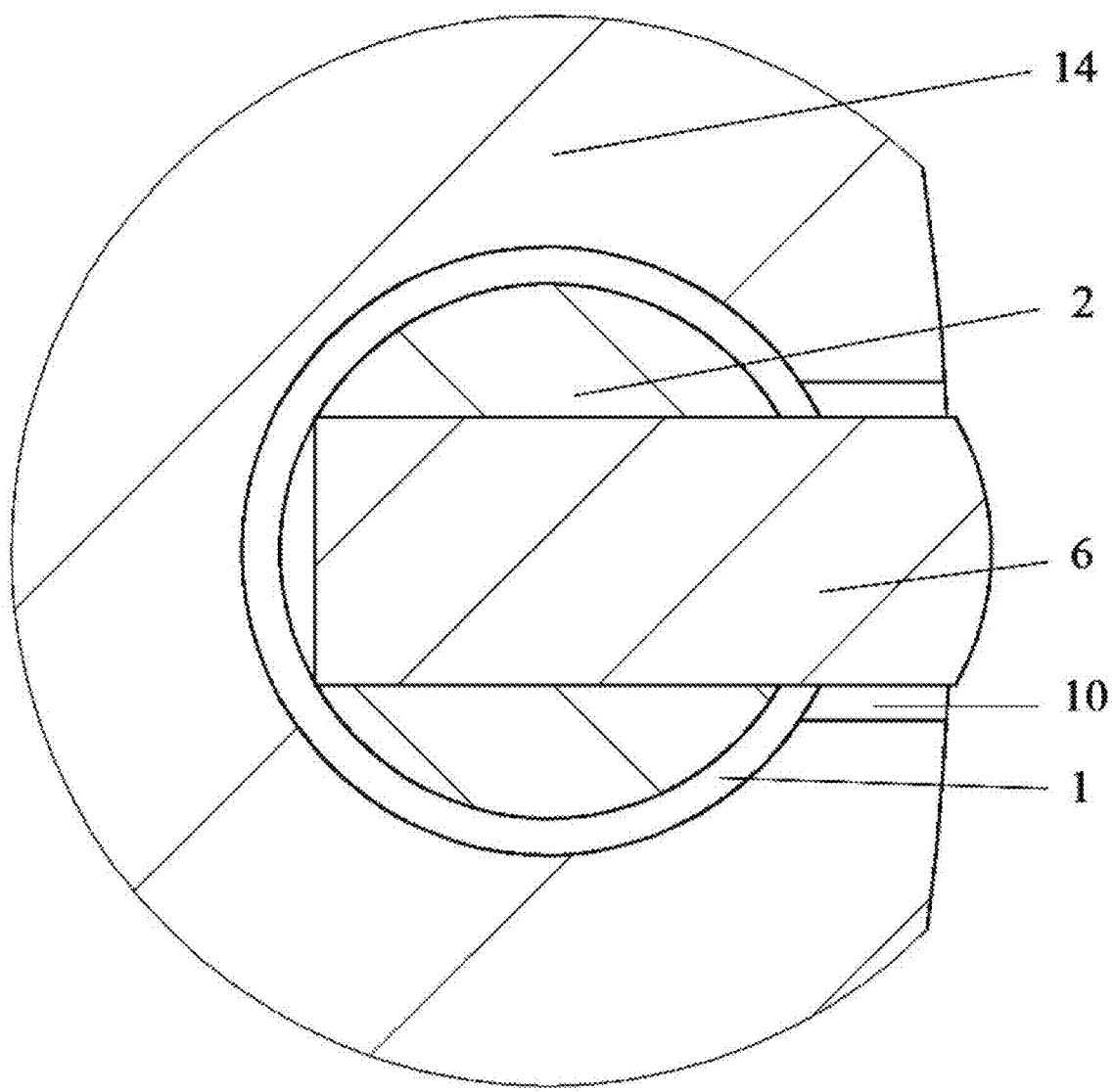
FIG. 7 shows the installation of the latch into the main recess provided on the pole shaft of the pylon.

Device for switching over the operating mode of a dynamic pylon comprises of:

The latch 2 made as a pin of round cross-section featured with handle 6;

The shaft 14 of the pole 3 with the main recess 1 made as a blind hole of the round cross-section. In the wall of the shaft 14 a slot 10 is provided connecting the recess 1 with the outer space around the shaft 14 and opened into the outer space around the shaft 14 and into the internal space of the recess 1. Handle 6 can be located in the slot 10 with a possibility of movement therein. The installation of the latch 2 with the handle 6 into the main recess 1 with the slot 10 of the shaft 14 is shown in FIG. 7;

The bushing 16 of the support 4 with the counter-recess 8 made as a blind hole of the round cross-section;

Magnetic lock intended to create an obstacle for the spontaneous movement of the latch 2 inside the main recess 1 downward from the upper end.

Magnetic lock comprises of three members:

The first member of the magnetic lock—magnet comprising of one permanent magnet 7—a monolithic cylindrically shaped detail made of magnetically hard material;

The second member of a magnetic lock of the shaft 14 with the main recess 1. The shaft 14 is made of magnetically soft material—steel;

The third member of the magnetic lock—latch 2 made of magnetically soft material—steel.

The presence of force interaction of the permanent magnet 7 with the latch 2 and with the upper end of the recess 1 of the shaft 14 to hold the latch 2 at the upper end of the recess 1 depends only on the relative position of the members which form the magnetic lock and does not depend on the surface of which element the permanent magnet 7 is permanently fixed by the force of magnetic attraction.

When the permanent magnet 7 is permanently fixed by the force of magnetic attraction at the upper end of the recess 1, it is necessary that the distance from the lower end of the magnet 7 to the surface of the bushing 16 of the support 4 should be greater than the length of the latch 2, so that the force of magnetic interaction between the magnet 7 and the latch 2 (in its the lower position at the surface of the bushing 16 of the support 4) is less than the gravity of the latch 2 and therefore, could not attract the latch 2 to the magnet 7.

When the magnet 7 is permanently fixed by the force of magnetic attraction at the upper end of the latch 2, it is necessary that the distance from the upper end of the recess 1 to the surface of the bushing 16 of the support 4 to be greater than the length of the latch 2 including the height of the magnet 7, so that the force of magnetic interaction between the magnet 7 and the latch 2 (in its lower position at the surface of the bushing 16 of the lower support) is less than the total gravity of the magnet 7 and the latch 2, and therefore could not attract the magnet 7 with the latch 2 to the upper end of the recess 1.

Device for switching over the operating mode of a dynamic pylon shown in FIG. 6 operates as follows:

Under the condition shown in FIG. 6 the pylon is in dynamic operating mode—the latch 2 is located only in the main recess 1 of the shaft 14 of the pole 3 and outside the counter-recess 8 of the bushing 16 of the support 4, and the pole 3 can rotate. In this position the permanent magnet 7—the first member of the magnetic lock, located inside the recess 1, fixed by the force of magnetic attraction at the upper end of the recess 1 of the shaft 14—the second member of the magnetic lock. At the same time the magnet 7 fixes the latch 2—the third member of the magnetic lock—by the force of magnetic attraction at its lower end.

To switch over the pylon to a static operating mode it is necessary acting in the direction from top to bottom upon the handle 6 of the latch 2, until the latch 2 stops interacting with the magnet 7 or until the magnet 7 stops interacting with the upper end of the recess 1. Under the gravity and/or as a result of action upon the handle 6, the latch 2 will move down and (if it failed to get into the counter-recess 8) then it will stop when it reaches the surface of the bushing 16. Further the pole 3 is to be turned, so that the latch 2 is positioned above the recess 8. Under the gravity the latch 2, provided with lead-in sections, is partially sunk into the counter-recess 8. Since the latch 2, due to its small geometric dimensions, has a low weight and a friction force acting between the latch wall 2 and the wall of the main recess 1, then the gravity of the latch may not be enough to fully sink it into the counter-recess 8. In such a situation it is necessary to continue acting on the handle 6, with the simultaneous reverse rotation of the pole 3, and thereby to ensure that the lower end of the latch 2 reaches the lower end of the recess 8, for reliable fixation of the pylon in a static operating mode. In the situation the latch 2 is located simultaneously both in the recess 1 and in the recess 8 and creates a mechanical obstacle to the pole 3 rotation. The pylon is in the static operating mode.

To return the pylon to the dynamic operating mode, a control action is to be performed in the direction from bottom to top on the handle 6 of the latch 2 until the latch 2 approaches the lower end of the magnet 7, or the magnet 7 approaches the upper end of the recess 1 at a distance, when the magnet 7 will start interacting with the latch 2 or with the upper end of the recess 1. As a result of the action of the force of attraction of the magnet 7 the latch 2 will move to the magnet 7, or the magnet 7 together with the latch 2 will move to the upper end of the recess 1. In both cases the magnet 7 is held at the upper end of the recess 1, and at the same time holds the latch 2 at its lower end. In the situation the latch 2 is located only in the recess 1 and beyond the recess 8 and does not create a mechanical obstacle to the vertical crossbeam 3 rotation. The pylon is in the dynamic operating mode.

If the shaft 14—the third member of the magnetic lock—is made of a material that does not exhibit magnetic properties, then in the main recess 1 or, for example, in the deepening at its upper end at least one detail is installed made of magnetically soft material, i.e., the shaft 14 is made at least partially of a magnetically soft material. A detail made of a magnetically hard material—a permanent magnet—can be installed either in the main recess 1 or in the deepening in its upper end (not shown in FIG. 6).

If the latch 2 is made of a material that does not exhibit magnetic properties, then at least one detail made of a magnetically soft material is installed in the deepening in the upper end of the latch 2, i.e., the latch 2 is made at least partially of a magnetically soft material. Or at least one part made of a magnetically hard material is installed—a permanent magnet—in the deepening in the upper end of the latch 2 (not shown in FIG. 6).

Figure 8:
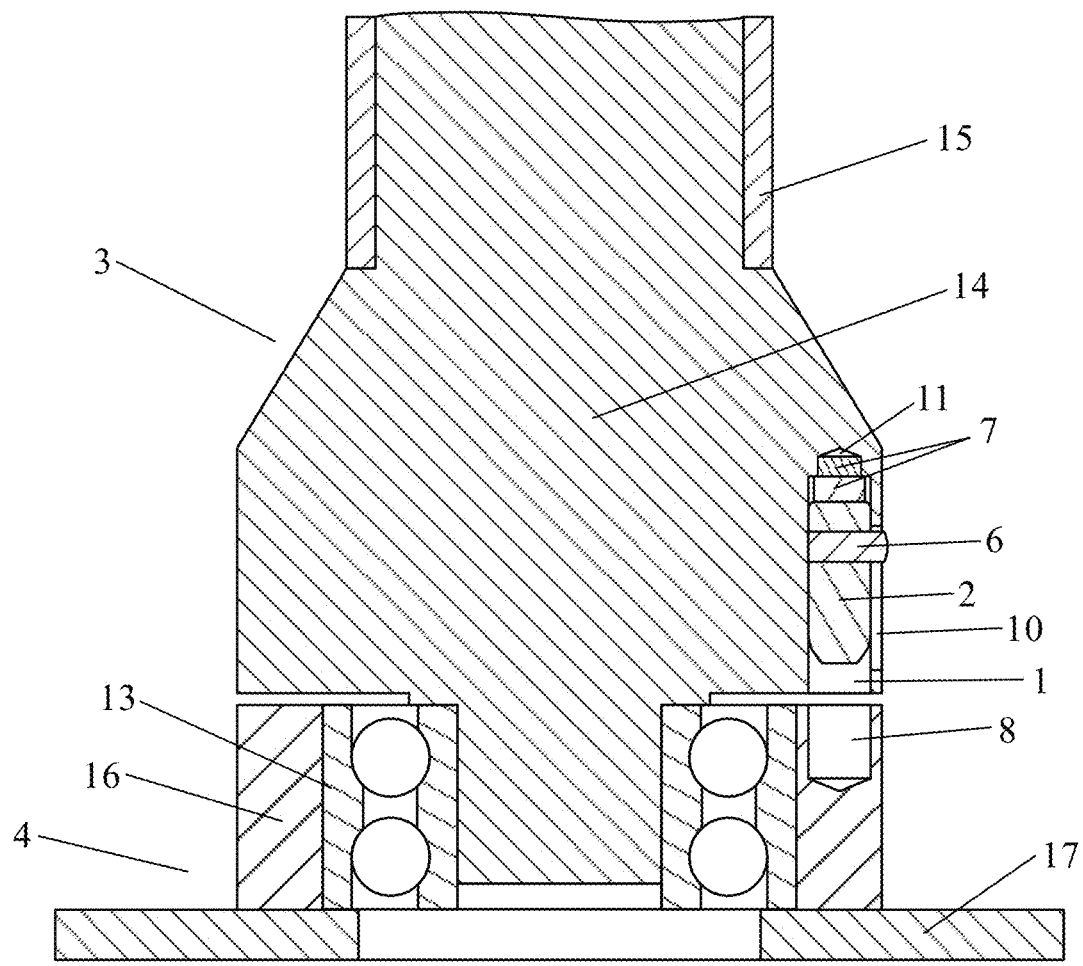
FIG. 8 repeats the view of the axial section of a part of the dynamic pylon with the device for switching over its operating modes shown in FIG. 6. Design description and operational features of the device for switching over the operating modes of a dynamic pylon shown in FIG. 6 is applicable for the device shown in FIG. 8, with exception of two features of construction.

FIG. 8 repeats the view of the axial section of a part of the dynamic pylon with the device for switching over its operating modes shown in FIG. 6. Design description and operational features of the device for switching over the operating modes of a dynamic pylon shown in FIG. 6 is applicable for the device shown in FIG. 8 with the exception of two features of construction.

Feature of construction is that the additional permanent magnet 7 (upper in FIG. 8)—a monolithic cylindrical detail made of magnetically hard material installed with glue in the cavity 11 on the lower end of the main recess 1 of the shaft 14 made of stainless steel—a non-magnetic material. The permanent magnet 7 (the lower one in FIG. 8)—a monolithic cylindrical detail made of magnetically hard material installed with glue on the lower end of the latch 2.

The use of an additional permanent magnet 7 installed on the third member of the magnetic lock in the device for switching over the operating modes of a dynamic pylon increases the force of interaction between the members of the magnetic lock in the case when these members are located at a distance from each other.

A performer of exercises on the pylon a part whereof is shown in FIG. 6 switches it over from dynamic operating mode into static one as follows: having rotated the pole 3 clockwise or counter-clockwise the performer sets up the handle 6 of the latch 2 in position where it will be convenient to manipulate thereby. A performer can regulate the position of the handle 6 visually or by touch: by hand or by feet. By acting, for example, with a foot on the handle 6 of the latch 2 a performer moves the handle 6 down until it stops. Then the pole 3 turns clockwise or counter-clockwise until it stops due to the partial sinking into the recess 8 of the latch 2 part which has lead-in sections. By pressing repeatedly, the handle 6 and/or reverse rotation of the pole 3, a performer moves the handle 6 down until it stops. The pylon is in the static operating mode.

Returning the pylon from static to dynamic operating mode is performed as follows: acting by touching, for example, with a foot on the handle 6 of the latch 2, a performer moves it up to a position wherefrom the latch 2 with the handle 6 without the participation of a performer will move up and stop in the upper position. The pylon is in the dynamic operating mode.

A mark indicating the location of the counter-recess 8 in the bushing 16 of the support 4 of the pylon can be applied to the disc 17.

Figure 9:
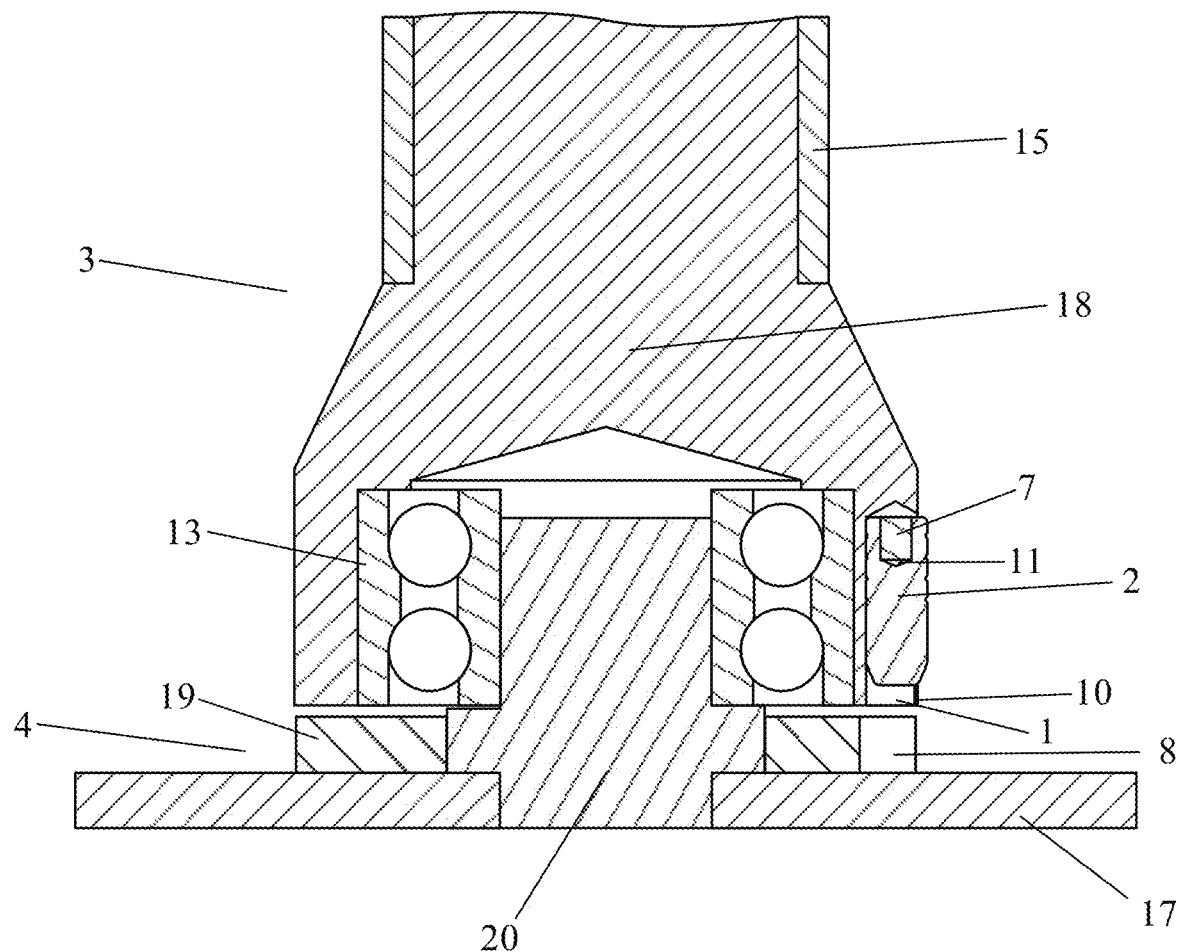
FIG. 9 shows an axial section of a part of the dynamic pylon in the dynamic operating mode with the device for switching over the operating modes with magnetic lock, when the main recess is provided in the detail of pole of the pylon, the counter-recess is provided in the detail of the support of the pylon located at the lower bearing surface for the pylon.

Example 4. FIG. 9 shows an axial section of a part of the dynamic pylon with the device for switching over the operating modes, when the lower support 4 of the pylon is located on the lower bearing surface (for example, on the stage floor). Bushing 18 and pipe 15 are connected with an interference fit installation method and form a part of the pole 3. The other details of the pole 3 are not shown in FIG. 9. Ring 19, disc 17 and axle 20 compose the lower support. Ring 19 and disc 17 are joined together with screw connections. The screw connections and other details of the support 4 are not shown in FIG. 9. Axle 20 is installed in the holes of the ring 19 and disc 17. Bearing 13 is installed in the bushing 18 and onto the axle 20.

Figure 10:
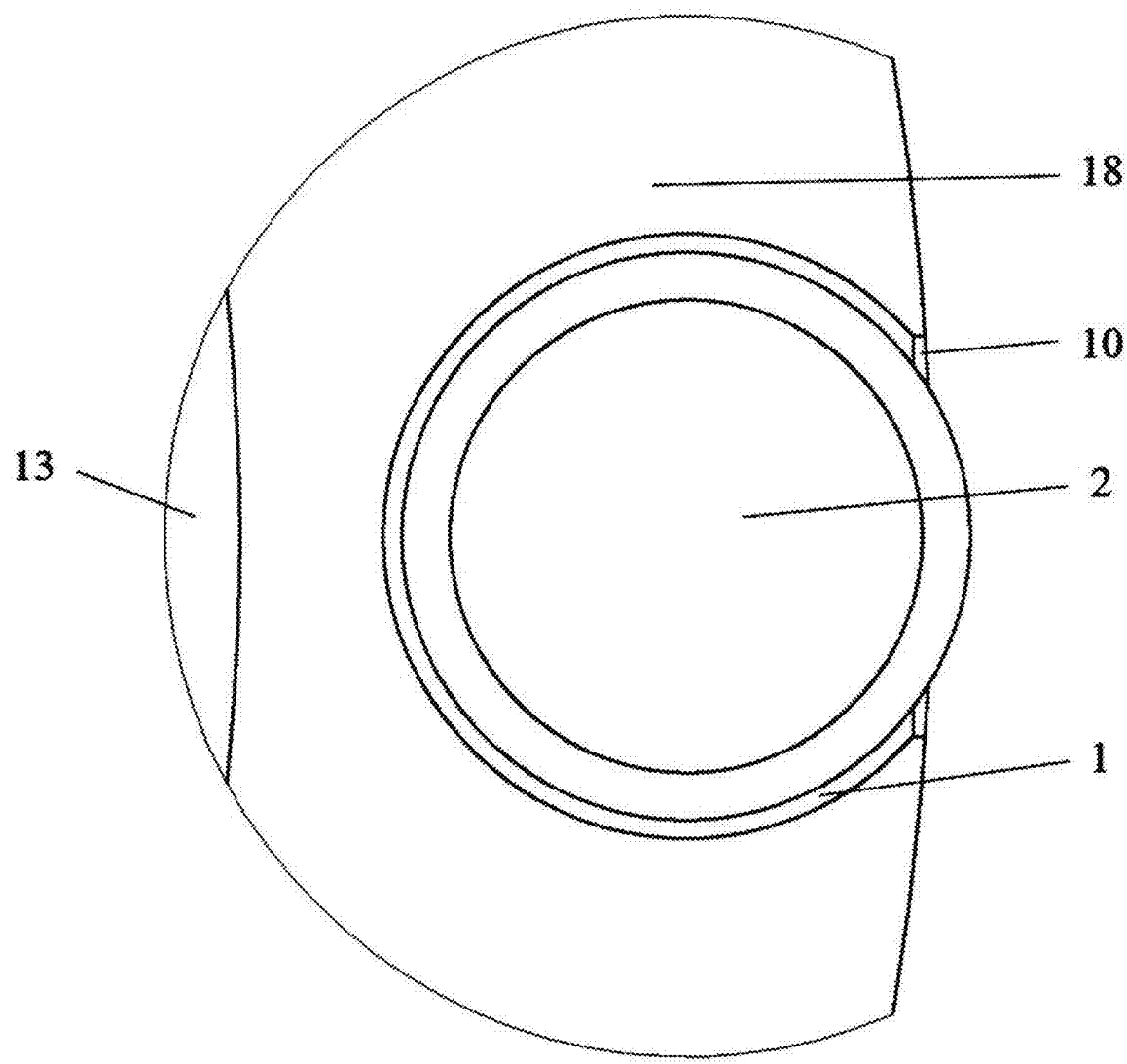
FIG. 10 shows the installation of the latch into the main recess provided on the pole bushing of the pylon.

Device for switching over the operating mode of a dynamic pylon comprises of:

The latch 2 performed as a pin of round cross-section with a lateral surface having deepenings;

The bushing 18 of the pole 3 with the main recess 1 performed as a blind hole of the round cross-section. A slot 10 is formed in the lateral wall of the bushing 18 of the pole 3 which connects the recess 1 with the outer space around the bushing 18 and opened to the outer space and downward. A part of the latch 2 protrudes from the main recess 1 towards the outer space through the slot 10 beyond the ring dimension of the bushing 18. The installation of the latch 2 into the main recess 1 with the slot 10 of the bushing 18 is shown in FIG. 10;

The ring 19 of the lower support with the counter-recess 8 opened to the outer space and upward. Counter recess 8 is formed by the vertical walls of the groove provided in the ring 19 and the upper surface of the disc 17 of the support 4;

The magnetic lock intended to create an obstacle for the spontaneous movement of the latch 2 inside the recess 1 downward from the upper end.

Magnetic lock comprises:

The first member of the magnetic lock—permanent magnet 7—a monolithic cylindrically shaped detail made of magnetically hard material;

The second member of the magnetic lock—latch 2 made of magnetically soft material—steel. In the upper end of the latch 2 a cavity 11 of a cylindrical shape is made wherein a permanent magnet 7 is fixed by means of glue;

The third member of a magnetic lock—the bushing 18 of the pole 3 with the main recess 1. Bushing 18 is made of magnetically soft material—steel. The upper end of the main recess 1 is intended for the engagement with the permanent magnet 7.

When the permanent magnet 7 is fixed at the upper end of the latch 2 in the cavity 11, for example, using glue the distance from the upper end of the recess 1 till the surface of the ring 19 of the support 4 is required to be greater than the length of the latch 2. In this manner the force of magnetic interaction between the magnet 7 and the upper end of the recess 1, when latch 2 in its lower position at the surface of the ring 19 is less than the gravity of the latch 2, and therefore could not attract the latch 2 to the upper end of the recess 1.

Device for switching over the operating mode of a dynamic pylon shown in FIG. 9 operates as follows:

Under the condition shown in FIG. 9 the pylon is in dynamic operating mode—the latch 2 is located only in the main recess 1 and outside the counter-recess 8. The pole 3 can rotate. In this position the permanent magnet 7 (the first member of the magnetic lock) installed in the upper end of the latch 2 in the cylindrical cavity 11 (the second member of the magnetic lock) fixes the latch 2 at the upper end of the recess 1 (the third member of the magnetic lock) by the magnetic attraction force.

To switch the pylon to a static operating mode an action is to be performed in the direction from top to bottom on the part of the latch 2 protruding from the recess 1, until the permanent magnet 7 stops interacting with the upper end of the recess 1. Under the gravity and/or as a result of ongoing action the latch 2 will move down. If the latch 2 failed to get in the counter-recess 8 from the first attempt, then it will stop as soon as it reaches the surface of the ring 19. Further the pole 3 is to be turned so that the latch 2 is above the recess 8. Under the gravity and/or as a result of ongoing action upon the latch 2, the latter having lead-in sections is partially sunk into the recess 8. Next the position of the latch 2 in the recess 8 is to be corrected, continuing to act on the latch 2 and/or reversibly rotating the pole 3. That will ensure the latch 2 to drop down into the counter-recess 8 to its lower end. In the situation the latch 2 is located simultaneously both in the recess 1 and in the recess 8 and creates a mechanical obstacle to the pole 3 rotation. The pylon is in the static operating mode.

To return the pylon to the dynamic operating mode a control action is to be performed in the direction from bottom to top, for example, with a foot on the part of the latch 2 protruding towards the outer space beyond the dimensions of the bushing 18 of the pole 3, until the latch 2 with magnet 7 approaches the upper end of the recess 1 at a distance when the magnet 7 will start interacting with the upper end of the recess 1. As a result of the action of the force of attraction of the magnet 7, the latch 2 together with the magnet 7 will move to the upper end of the recess 1. In this situation of the method the latch 2 is located only in the recess 1 and beyond the recess 8, and does not create a mechanical obstacle to the pole 3 rotation. The pylon is in the dynamic operating mode.

If the bushing 18 of the pole 3 is made of non-magnetic material, then in the main recess 1 or in the deepening, located in its upper end at least one detail is installed made of magnetically soft material, for example, steel. This means that the bushing 18 is made at least partially of magnetically soft material. A detail made of a magnetically hard material—a permanent magnet—can be installed in the main recess 1 or in the deepening in its upper end (not shown in FIG. 9).

The performer of exercises on the pylon, partially shown in FIG. 9, switches it over from dynamic operating mode into static one as follows: having rotated the pole 3 clockwise or counter-clockwise, the performer set up the latch 2 in position where it is ease to be manipulated A performer can regulate the position of the latch 2 visually or by touch: by hand or by feet. A performer acting, for example, with a foot on the latch 2 moves it down until it stops. Then the pole 3 turns clockwise or counter-clockwise until it stops that is an indication of alignment of the latch 2 with the counter-recess 8 and its partial sinking therein. By pressing repeatedly, the latch 2 and/or reverse rotation of the pole 3 a performer moves the latch 2 down until it stops. The pylon is in the static operating mode.

Returning the pylon from static to dynamic operating mode is performed as follows: acting by touching, for example, with a foot on the latch 2 a performer moves it up to a position when the latch 2 without the participation of a performer will move up and stop in the upper position. The pylon is in the dynamic operating mode.

Figure 11:
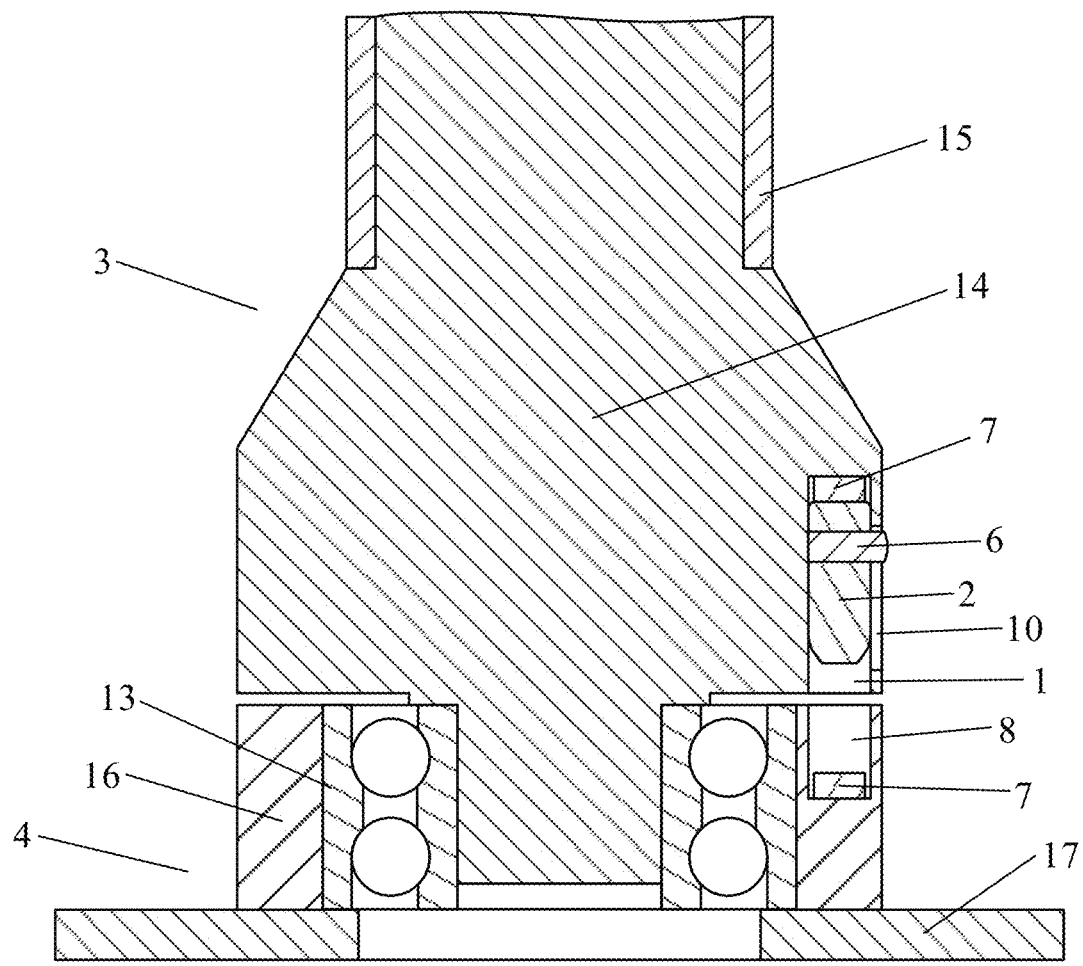
FIG. 11 repeats the view of the axial section of a part of the dynamic pylon with the device for switching over its operating modes shown in FIG. 6. Design description and operational features of the device for switching over the operating modes of a dynamic pylon shown in FIG. 6 is applicable for the device shown in FIG. 11, with exception of one constructional and one operational features.

Example 5. FIG. 11 repeats the view of the axial section of a part of the dynamic pylon with the device for switching over its operating modes shown in FIG. 6. Design description and operational features of the device for switching over the operating modes of a pylon shown in FIG. 6 remain in force for the device shown in FIG. 11 with exception of one constructional and one operational features.

Constructional feature is that the additional permanent magnet 7 (lower in FIG. 11)—a monolithic cylindrical detail made of magnetically hard material installed, for example, with glue on the lower end of the latch 8 for interaction with the latch 2 performed of magnetically soft material—steel.

An additional permanent magnet 7, as the first member of the second magnetic lock, the bushing 16 with the counter-recess 8, wherein the additional permanent magnet 7 is installed as the second member of the second magnetic lock, the latch of the support 2 made at least partially of magnetically soft material—steel, as the third member of the second magnetic lock form the second magnetic lock. The second magnetic lock is intended for movement of the latch 2 from the position when the latch 2 is above the recess 8 in the direction into the depth of the recess 8 and to hold the latch 2 at the end of the recess 8, in case when the support 4 is installed on the upper bearing surface, such as a ceiling of a stage. In this manner, the pylon lower support becomes the upper support of the pylon and the pylon upper support becomes the lower support of the pylon.

Operation of the device for switching over the operating mode of a dynamic pylon shown in FIG. 11 differs from operation of the device for switching over the operating modes of a pylon shown in FIG. 6 in that the movement of the latch 2 into the depth of the recess 8 takes place as a result of the action on the latch 2 of the magnetic attraction force of an additional permanent magnet 7, installed at the lower end of the recess 8. This movement of the latch 2 does not require human participation Operational feature of the device for switching over the operating mode of a dynamic pylon shown in FIG. 11 against the device shown in FIG. 6 is that a performer of the exercises on the pylon does not need to continue the action on the handle 6 after the members of the first magnetic lock stop their interaction: the upper magnet 7 and the latch 2 or the upper end of the recess 1 and the upper magnet 7. After alignment of the latch 2 with the recess 8 the latch 2, as the third member of the second magnetic lock, will interact with the lower magnet 7—the first member of the second magnetic lock and move until it is completely sunk into the recess 8 of the bushing 16—the second member of the second magnetic lock at a speed exceeding the physiological athletic ability of a performer.

Figure 12:
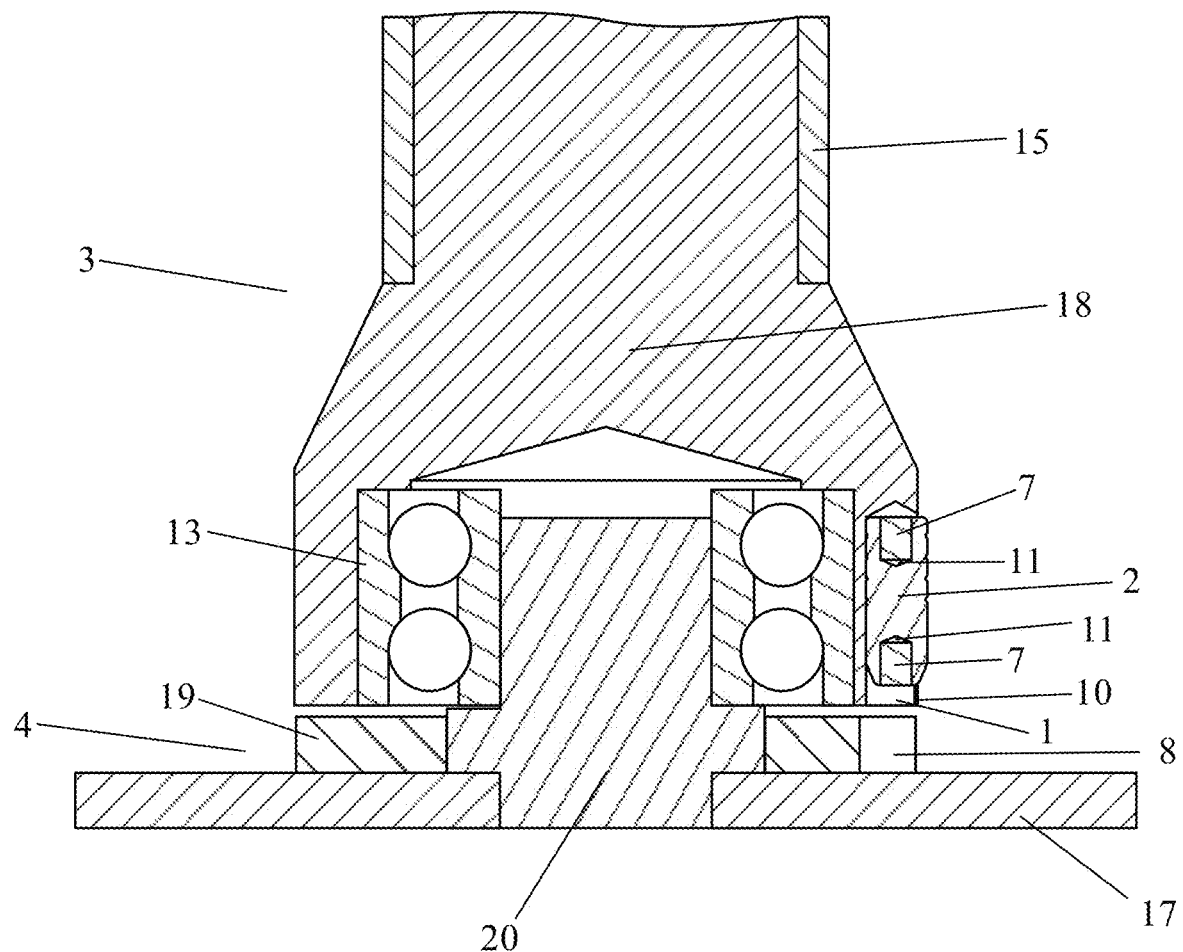
FIG. 12 repeats the view of the axial section of a part of the dynamic pylon with the device for switching over its operating modes shown in FIG. 9. Design description and operational features of the device for switching over the operating modes of a dynamic pylon shown in FIG. 9 is applicable for the device shown in FIG. 12, with exception of one constructional and two operational features.

Example 6. FIG. 12 repeats the view of the axial section of a part of the dynamic pylon with the device for switching over its operating modes shown in FIG. 9. Design description and operational features of the device for switching over the operating modes of a dynamic pylon shown in FIG. 9 remain in force for the device shown in FIG. 12, except for one constructional and two operational features.

Construction feature is that the additional permanent magnet 7 (lower in FIG. 12)—a monolithic cylindrical detail made of magnetically hard material is installed with glue on the lower end of the latch 2 in a cavity 11 formed as a hole of a circular cross-section.

In this case an additional permanent magnet 7, as the first member of the second magnetic lock, the latch 2 in the cavity 11 at the lower end of which this magnet 7 is installed, as the second member of the second magnetic lock, and the ring 19 of the support 4 made at least partially of magnetically soft material—steel as the third member of the second magnetic lock form the second magnetic lock. The second magnetic lock is intended for movement of the latch 2 to the ring 19 and to hold the latch 2 at the ring 19 in case when the support 4 is installed on the upper bearing surface for the pylon, for example, a ceiling of a stage. In this manner, the lower support becomes the upper support, and the upper support becomes the lower support.

In this case an additional permanent magnet 7, as the first member of the third magnetic lock, the latch 2 in the cavity 11 at the lower end whereof this magnet 7 is installed, as the second member of the third magnetic lock, and the disc 17 of the support 4, made at least partially of magnetically soft material—steel, as the third member of the third magnetic lock, form the third magnetic lock. The third magnetic lock is designed to move the latch 2 from the position, when the latch 2 is above the recess 8, in the direction into the depth of the recess 8, and to hold the latch 2 in the position where its part is located inside the recess 8, in the case when this support 4 is installed on the upper bearing surface, such as a ceiling of a stage. In this manner, the lower support becomes the upper support, and the upper support becomes the lower support.

In this case the distance from the upper end of the main recess 1 for the latch 2 in the bushing 18 of the pole 3 to the ring 19 of the support 4 is greater than the length of the latch 2, so much that the latch 2 can be removed from the upper end of the recess 1 downward by the distance at which the magnetic attraction force between the magnet 7 installed in the cavity 11 on the upper end of the latch 2 and the upper end of the recess 1 will become less than the magnetic attraction force between the permanent magnet 7 installed in the cavity 11 at the lower end of the latch 2 and the ring 19 of the support 4.

Operation of the device for switching over the operating mode of a dynamic pylon shown in FIG. 12 differs from operation of the device for switching over the operating mode of a dynamic pylon shown in FIG. 6 in that the movement of the latch 2 to the ring 19 of the support 4 begins after a short control action on the part of the latch 2 protruding from the bushing 18, resulting in the latch 2 will move to a position where the magnetic attraction force between the permanent magnet 7 installed in the cavity 11, at the upper end of the latch 2 and the upper end of the main recess 1 will become less than the magnetic attraction force between the permanent magnet 7 installed in the cavity 11 at the lower end of the latch 2 and the ring 19 of the support 4. Further movement of the latch 2 to the ring 19 takes place as a result of magnetic interaction between the permanent magnet 7 installed in the cavity 11 at the lower end of the latch 2 and the ring 19 of the support 4, which are the members of the second magnetic lock. The movement of the latch 2 to the counter-recess 8 takes place because of magnetic interaction between the permanent magnet 7, installed in the cavity 11 at the lower end of the latch 2, and the disc 17 of the support 4, which are the members of the third magnetic lock.

Operational feature of the device for switching over the operating mode of a dynamic pylon shown in FIG. 12 against the device shown in FIG. 9 is that a performer of the exercises on the pylon does not need to continue the action on the latch 2, after the members of the first magnetic lock stop their interaction: the upper magnet 7 and the upper end of the recess 1 of the bushing 18. For a performer it is enough to move the latch 2 from the upper end of the recess 1 to a distance where the magnetic attraction force between the permanent magnet 7, installed in the cavity 11 on the lower end of the latch 2, and the ring 19 of the support 4, will move the latch 2 to the surface of the ring 19 at a speed exceeding the physiological athletic ability of a performer.

The second operational feature lies in the fact that after the alignment of the latch 2 with the recess 8, the lower magnet 7 as the first member of the third magnetic lock, will interact with the disc 17—the third member of the third magnetic lock, and move the latch 2 (the second member of the third magnetic the lock) until it is completely sunk into the recess 8 of the ring 19 at a speed exceeding the physiological athletic ability of a performer.

DESCRIPTION OF THE PREFERRED EMBODIMENT

Figure 13:
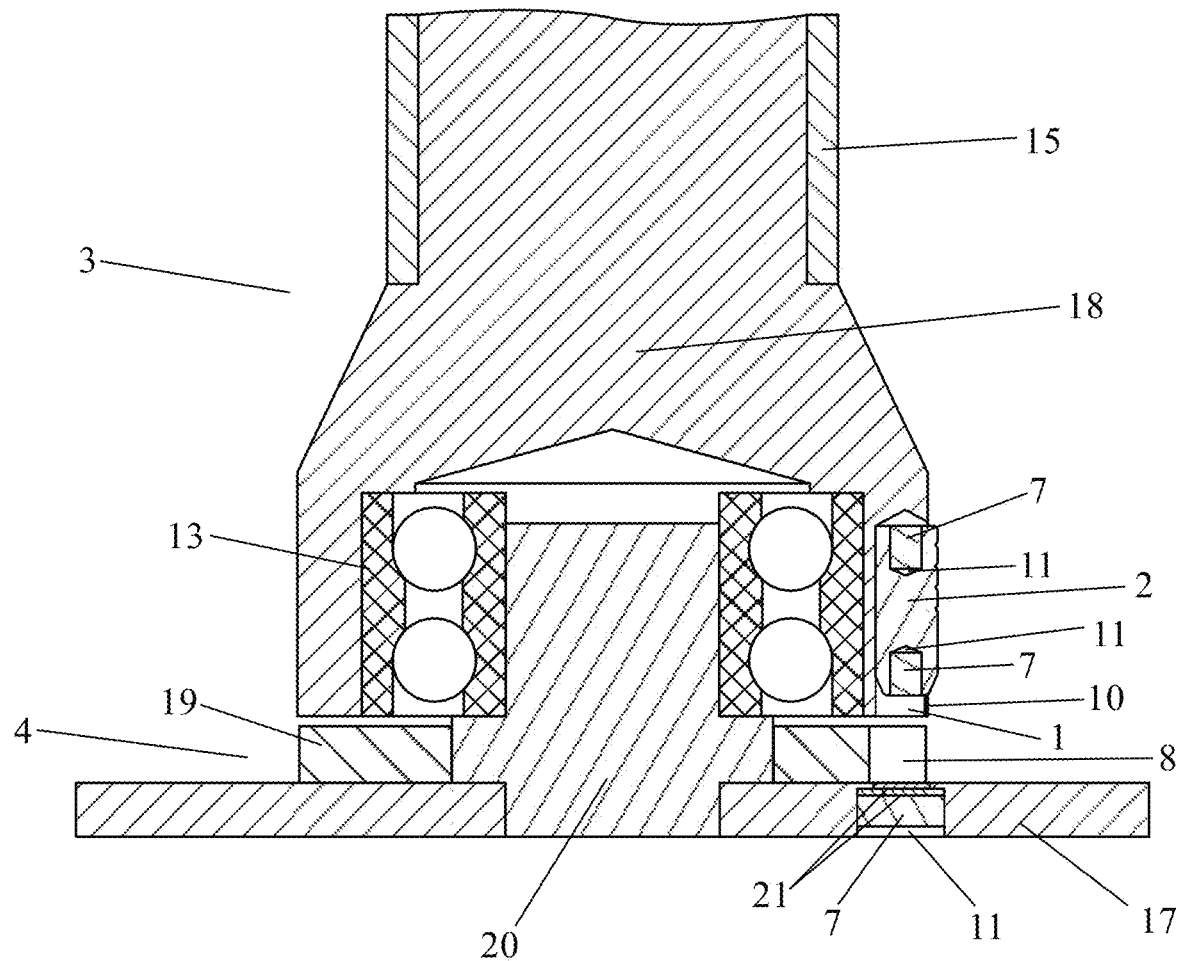
FIG. 13 repeats the view of the axial section of a part of the dynamic pylon with the device for switching over its operating modes shown in FIG. 12. Design description and operational features of the device for switching over the operating modes of a dynamic pylon shown in FIG. 12 is applicable for the device shown in FIG. 13, with exception of one constructional and one operational features.

Example 7. FIG. 13 repeats the view of the axial section of a part of the dynamic pylon with the device for switching over its operating modes shown in FIG. 12. Design description and operational features of the device for switching over the operating modes of a pylon, shown in FIG. 12, is applicable for the device shown in FIG. 13, with the exception of one constructional and one operational feature.

Construction feature is that the additional permanent magnet 7 (lower in FIG. 13)—a monolithic cylindrically shaped detail made of magnetically hard material installed with glue in a cavity 11 in the form of a through hole of a stepped shape in the disc 17 of the support 4, opposite the permanent magnet 7 installed in the cavity 11 in the lower end of the latch 2. There are two gaskets made of magnetically permeable material positioned on the upper end of the magnet 7 in the cavity 11 in the disc 17 to protect the magnet 7 from mechanical contacts with the latch 2. (Not shown in FIG. 13)

Additional permanent magnet 7 (the lower one in FIG. 13) installed in the cavity 11 in the disc 17, considered earlier in the example 6 as the third member of the third magnetic lock, increases the force of magnetic interaction between the members of the third magnetic lock, which moves the latch 2 from the position where the latch 2 is above the recess 8 until its full sinking into the recess 8 and to hold the latch 2 in a position where its part is located inside the recess 8.

The operational features lie in the fact that the lower magnet 7, installed on the third member of the third magnetic lock, increasing the force of magnetic interaction between the members of the third magnetic lock will increase the speed of movement of the latch 2 until its full sinking into the recess 8, and will increase the reliability of the device for switching over the operating modes of a pylon and will make it possible to increase the depth of the cavity 8 of the support 4.

FIG. 14 shows two dynamic pylons with devices for switching over the operating modes the structure whereof shown in FIG. 13 located both at the lower bearing surface (for example, on the stage floor) and at the upper bearing surface (for example, the stage ceiling). But the dynamic pylon shown in FIG. 14 at the left, the screw 9 of the screw assembly of the pylon is located at the top of the pole 3, that provides convenience for the exercise to be performed on the pole 3. The dynamic pylon, shown in FIG. 14 at the right, the screw 9 of the screw assembly is located at the bottom of the pole 3 that provides convenience for the dismantling the pylon at the operational location.

INDUSTRIAL APPLICABILITY

Thus, meeting a problem on creating a new device for switching over the operating modes of a dynamic pylon which makes it possible to facilitate and speed up the process of switching over the operating mode of a dynamic pylon is that in the new device for switching over the operating modes of a dynamic pylon the main recess for the latch in the pylon assembly is performed opened from the side of its lateral wall towards the outer space around the pylon detail wherein it is performed and that the latch is performed as a member of a magnetic lock composing at least one permanent magnet that the permanent magnet is installed in a cavity therefor with a sinking that a few magnetic locks can be installed the permanent magnets whereof can ensure the movement of the latch. Facilitation and speed up of the process of switching over the operating modes of the dynamic pylon is that the latch can be moved with one hand or foot without bowing down or sitting down without interrupting the performance both in the usual manual mode and in the semi-automatic mode when the latch independently moves along the part of the main recess for the latch without the participation of a performer at a speed exceeding the physiological athletic ability of a performer.

The device proposed for switching over the operating modes of a pylon facilitates and reduces the cost of pylons manufacturing as it has a simple design that ensures ease of assembly of the pylon and consists of a small number of simple to manufacture details of small dimensions. Thus, the technical result of the utility model is fully achieved.

In addition, the technical solution proposed makes it possible to locate the device for switching over the operating modes of a dynamic pylon at the lower support 4 of the pylon at the upper support 5 and simultaneously at both supports. This in its turn makes it possible to manufacture double-sided poles 3 of pylons and double-sided pylons the design thereof allows to choose the screw location of the screw assembly of the pylon.

The invention claimed is:

1. A device for switching the operating mode of a dynamic pylon, said device comprising:
   a latch that creates a mechanical obstacle to the rotation of a pole of the dynamic pylon; at least one part of a member of the dynamic pylon, said part comprising a main recess for the latch, wherein the latch is permanently and at least partially located and can travel linearly inside this main recess;
   at least one part of another member of the dynamic pylon, said part comprising a counter-recess wherein the latch partially has temporary accommodation for creating a mechanical obstacle to the rotation of the pole;
   a magnetic lock that creates an obstruction to the travel of the latch within the main recess away from the required position, said obstruction is created by means of magnetic force created by a magnetic unit, said lock comprising:
   first, the magnetic unit comprising at least one permanent magnet;
   second, at least one part that the magnetic unit is installed thereon;
   third, at least one part that is periodically temporarily engaged with the magnetic unit,
   wherein the main recess communicates at the side of its lateral wall with an outer space, which surrounds the dynamic pylon member part where the main recess is located.

2. The device for switching the operating modes of the dynamic pylon of claim 1, wherein the main recess communicates to the outer space by a slot built in a side wall of at least one part of the dynamic pylon member where said part separates the main recess from outer space, which surrounds the dynamic pylon member part wherein the main recess is located.

3. The device for switching the operating modes of the dynamic pylon of claim 2, wherein the slot provides an access to the latch.

4. The device for switching the operating modes of the dynamic pylon of claim 2, wherein the latch extends partially from the main recess through the slot beyond the overall dimensions of at least one dynamic pylon member part where the main recess is provided.

5. The device for switching the operating modes of the dynamic pylon of claim 1, wherein the main recess is a groove located at the lateral wall of at least one part of a member of the pylon.

6. The device for switching the operating modes of the dynamic pylon of claim 5, wherein the latch partially extends beyond the overall dimensions of at least one pylon part where the groove is located.

7. The device for switching the operating modes of the dynamic pylon of claim 1, wherein the latch is the second member of the magnetic lock and at least one dynamic pylon member part where the main recess is located, said part is the third member of the magnetic lock.

8. The device for switching the operating modes of the dynamic pylon of claim 1, wherein the latch is the second member of the magnetic lock and at least one permanent magnet is installed on at least one dynamic pylon member part where the main recess is located, said part is the third member of the magnetic lock.

9. The device for switching the operating modes of the dynamic pylon of claim 1, wherein the latch is the third member of the magnetic lock, and at least one dynamic pylon member part wherein the counter-recess is located is the second member of the magnetic lock.

10. The device for switching the operating modes of the dynamic pylon of claim 1, wherein the permanent magnet is installed in a cavity made for the permanent magnet in the dynamic pylon member part with a sinking in relation to the wall surface of the pylon member part, where the cavity is made.

11. The device for switching the operating modes of the dynamic pylon of claim 10, wherein the permanent magnet is installed in the cavity in the dynamic pylon member part with the sinking in relation to the wall surface of the dynamic pylon member part where said cavity is made so that the force of magnetic attraction between permanent magnet and the walls of the cavity where it is installed is more than force of magnet attraction between the permanent magnet and its mating part.

12. The device for switching the operating modes of the dynamic pylon of claim 1, wherein the device comprises at least one additional magnetic lock that creates an obstacle for the travel of the latch in the main recess by the force of the magnetic unit of an additional magnetic lock, said magnetic unit comprising at least one permanent magnet.

13. The device for switching the operating modes of the dynamic pylon of claim 1, wherein the magnetic unit of the magnetic lock provides the travel of the latch in the main recess into the required position from the position where a performer placed it, wherein a magnetic force of the magnetic unit of the magnetic lock acting upon the latch exceeds the sum of the magnetic forces of magnetic units of other magnetic locks acting upon the latch, a force of gravity of the latch and forces of friction between the latch and the walls of the main recess and the counter-recess.

* * * * *